United States Patent
Choi et al.

(10) Patent No.: US 9,497,000 B2
(45) Date of Patent: Nov. 15, 2016

(54) METHOD FOR TRANSMITTING DATA UNITS IN WIRELESS LAN SYSTEMS AND APPARATUS FOR SUPPORTING SAME

(71) Applicant: LG Electronics Inc., Seoul (KR)

(72) Inventors: Jinsoo Choi, Anyang-si (KR);
Seunghee Han, Anyang-si (KR);
Jinsam Kwak, Anyang-si (KR);
Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 14/378,025

(22) PCT Filed: Feb. 13, 2013

(86) PCT No.: PCT/KR2013/001115
§ 371 (c)(1),
(2) Date: Aug. 11, 2014

(87) PCT Pub. No.: WO2013/122377
PCT Pub. Date: Aug. 22, 2013

(65) Prior Publication Data
US 2015/0023272 A1 Jan. 22, 2015

Related U.S. Application Data

(60) Provisional application No. 61/598,359, filed on Feb. 14, 2012, provisional application No. 61/598,910, filed on Feb. 15, 2012.

(51) Int. Cl.
*H04W 4/00* (2009.01)
*H04L 5/00* (2006.01)
*H04L 27/26* (2006.01)
*H04L 1/08* (2006.01)
*H04W 84/12* (2009.01)
*H04B 7/04* (2006.01)

(52) U.S. Cl.
CPC ............... *H04L 5/0044* (2013.01); *H04L 1/08* (2013.01); *H04L 27/2602* (2013.01); *H04L 27/2613* (2013.01); *H04L 27/2621* (2013.01); *H04B 7/0452* (2013.01); *H04W 84/12* (2013.01)

(58) Field of Classification Search
CPC ............... H04W 72/02; H04L 1/0013; H04L 25/03057; H04L 25/0216; H04L 27/3427; H04L 27/2602; H04L 5/0044; H04L 1/08; H04L 27/2621; H04L 27/2613
USPC ................. 370/203, 208, 328, 329, 338, 474
See application file for complete search history.

(56) References Cited

U.S. PATENT DOCUMENTS 7,453,793 B1 * 11/2008 Jones, IV ............ H04L 25/0216
370/203
2012/0263107 A1 * 10/2012 Taghavi
Nasrabadi ............. H04W 72/02
370/328

(Continued)

FOREIGN PATENT DOCUMENTS

| KR | 100866195 | 10/2008 |
|---|---|---|
| KR | 1020090124881 | 12/2009 |

(Continued)

OTHER PUBLICATIONS

Qualcomm et al., "IEEE P802.11 Wireless LANs: LB178 CID 2321", IEEE 802.11-11/1470r1, Nov. 4, 2011, pp. 2-3.

(Continued)

*Primary Examiner* — Anh Ngoc Nguyen
*Assistant Examiner* — Harun Chowdhury
(74) *Attorney, Agent, or Firm* — Dentons US LLP

(57) ABSTRACT

The present invention relates to a method for transmitting data units in wireless LAN systems. The method includes the steps of generating a short training field (STF) for a first channel, generating a long training field (LTF) for the first channel, duplicating the STF on at least one second channel, duplicating the LTF on at least one second channel, transmitting the STF and the one or more duplicated STFs through a transmission channel, transmitting the LTF and the one or more duplicated LTFs through the transmission channel, and transmitting a data field through the transmission channel.

12 Claims, 19 Drawing Sheets

(56) References Cited

U.S. PATENT DOCUMENTS

2012/0324315 A1* 12/2012 Zhang ............... H04L 1/004
    714/776
2014/0140357 A1* 5/2014 Kenney ............ H04L 27/2613
    370/474

FOREIGN PATENT DOCUMENTS

| KR | 1020090131398 | | 12/2009 |
|---|---|---|---|
| KR | 1020110048018 | A | 5/2011 |
| KR | 1020110093559 | | 8/2011 |

OTHER PUBLICATIONS

"Preamble for 120MHz", IEEE 802.11-10/1243r), Sun Bo, ZTE Corporation, Nov. 2010.
"160 MHz Transmissions", IEEE 802.11-10/0774r0, Youhan Kim, et al., Jul. 12, 2010.
"11ah Data Transmission Flow", IEEE 802.11-11/1484r1, Hongyuan Zhang, et al., Nov. 7, 2011.
"IEEE P802.11 Wireless LANs", IEEE 80211-11/1137r4, Minyoung Park, Intel, Jan. 19, 2012.
"Preamble Format for 1 MHz", IEEE 802.11-11/1482r4, Sameer Vermani, et al., Qualcomm, Jan. 16, 2012.

* cited by examiner

FIG. 15

| 1MHz Channel 1 | STF | LTF | SIG | | |
|---|---|---|---|---|---|
| 1MHz Channel 2 | STF | LTF | | | |
| 1MHz Channel 3 | STF | LTF | SIG | | |
| 1MHz Channel 4 | STF | LTF | | | |
| 1MHz Channel 5 | STF | LTF | SIG | | |
| 1MHz Channel 6 | STF | LTF | | | |
| 1MHz Channel 7 | STF | LTF | SIG | | |
| 1MHz Channel 8 | STF | LTF | | PSDU | 512FFT, 16MHz |
| 1MHz Channel 9 | STF | LTF | SIG | | |
| 1MHz Channel 10 | STF | LTF | | | |
| 1MHz Channel 11 | STF | LTF | SIG | | |
| 1MHz Channel 12 | STF | LTF | | | |
| 1MHz Channel 13 | STF | LTF | SIG | | |
| 1MHz Channel 14 | STF | LTF | | | |
| 1MHz Channel 15 | STF | LTF | SIG | | |
| 1MHz Channel 16 | STF | LTF | | | |

METHOD FOR TRANSMITTING DATA UNITS IN WIRELESS LAN SYSTEMS AND APPARATUS FOR SUPPORTING SAME

This application is a 35 USC §371 National Stage entry of International Application No. PCT/KR2013/001115 filed on Feb. 13, 2013, and claims priority to U.S. Provisional Application No. 61/598,359 filed on Feb. 14, 2012 and 61/598,910 filed on Feb. 15, 2012, all of which are hereby incorporated by reference in their entireties as if fully set forth herein.

BACKGROUND OF THE INVENTION

1. Field of the Invention

The present invention relates to wireless communication, and more particularly, to a method for transmitting data units in wireless LAN systems and an apparatus for supporting the same.

2. Related Art

In recent years, with the development of information and communication technology, various wireless communication technologies have been developed. Among them, a Wireless Local Area Network (WLAN) is a technology that enables a portable terminal such as a Personal Digital Assistant (PDA), a laptop computer, and a Portable Multimedia Player (PMP) to access an Internet in a wireless scheme at a house, a business, or a specific service providing zone.

Unlike an existing wireless LAND system for supporting High Throughput (HT) and High Throughput (VHT) using 20/40/80/160/80+80 MHz bandwidth of 2 GHz and/or 5 GHz band, a wireless LAN system capable of being operated at a band less than 1 GHz is suggested. If the wireless LAN system is operated at a band less than 1 GHz, service coverage by an access point AP may be expanded as compared with an existing LAN system. Accordingly, one AP manages more STAs.

Meanwhile, according to variation in a frequency band and a bandwidth of a used wireless channel, and rapid increase of service coverage due to this, various implementation examples with respect to a format of a new data unit usable in a next generation wireless LAN system and a transmitting method according thereto have been provided. According to the varied wireless environment and introduction of a varied format of the data unit, there is a need to suggest a method of transmitting data units capable of reducing performance degradation of a wireless LAN system and providing more efficient data processing performance.

SUMMARY OF THE INVENTION

The present invention provides a method for transmitting data units in a wireless local area network system and a device for supporting the same.

In an aspect, a method for transmitting data units in a wireless local area network system is provided. The method includes generating a short training field (STF) for a first channel, generating a long training field (LTF) for the first channel, duplicating the STF on at least one second channel, duplicating the LTF on at least one second channel, transmitting the STF and the one or more duplicated STFs through a transmission channel, transmitting the LTF and the one or more duplicated LTFs through the transmission channel, and transmitting a data field through the transmission channel.

The transmission channel may include the first channel and the at least one second channel.

A bandwidth of the first channel and a bandwidth of each of the second channel may be 1 MHz.

The transmission channel is a channel of a frequency band of 1 GHz or less.

The method may further include generating a signal field including control information on a unit channel, duplicating the signal field on the at least one channel, and transmitting the signal field and the one or more duplicated signal fields through the transmission channel.

The transmitting of the STF and the one or more duplicated STFs may include applying a first modulation vector to the STF and the one or more duplicated STFs, and transmitting the STF and the one or more duplicated STFs which the first modulation vector is applied.

The transmitting of the LTF and the one or more duplicated STFs may include applying a second modulation vector to the LTF and the one or more duplicated LTFs, and transmitting the LTF and the one or more duplicated LTFs which the first modulation vector is applied.

A length of the first modulation vector and a length of the second modulation vector may be 8 when a bandwidth of the transmission channel is 8 MHz. The applying of the first modulation vector to the STF and the one or more duplicated STFs may include sequentially applying an element of the first modulation vector to the one or more duplicated STFs from the STF. The applying of the second modulation vector to the LTF and the one or more duplicated LTFs may include sequentially applying an element of the second modulation vector to the one or more duplicated LTFs from the LTF.

The first modulation vector comprises one of vectors from a following equation.

$$a = \begin{cases} [1 \ 1 \ -1 \ -1 \ -1 \ -1 \ 1 \ -1] \\ [-1 \ -1 \ 1 \ 1 \ 1 \ 1 \ -1 \ 1] \\ [1 \ -1 \ 1 \ 1 \ 1 \ 1 \ -1 \ -1] \\ [-1 \ 1 \ -1 \ -1 \ -1 \ -1 \ 1 \ 1] \\ [1 \ -1 \ -1 \ 1 \ -1 \ 1 \ 1 \ 1] \\ [-1 \ 1 \ 1 \ -1 \ 1 \ -1 \ -1 \ -1] \\ [1 \ 1 \ 1 \ -1 \ 1 \ -1 \ -1 \ 1] \\ [-1 \ -1 \ -1 \ 1 \ -1 \ 1 \ 1 \ -1] \end{cases}$$

The second modulation vector may include one of vectors from a following equation.

$$b = \begin{cases} [1 \ 1 \ -1 \ -1 \ -1 \ -1 \ 1 \ -1] \\ [-1 \ -1 \ 1 \ 1 \ 1 \ 1 \ -1 \ 1] \\ [1 \ -1 \ 1 \ 1 \ 1 \ 1 \ -1 \ -1] \\ [-1 \ 1 \ -1 \ -1 \ -1 \ -1 \ 1 \ 1] \\ [1 \ -1 \ -1 \ 1 \ -1 \ 1 \ 1 \ 1] \\ [-1 \ 1 \ 1 \ -1 \ 1 \ -1 \ -1 \ -1] \\ [1 \ 1 \ 1 \ -1 \ 1 \ -1 \ -1 \ 1] \\ [-1 \ -1 \ -1 \ 1 \ -1 \ 1 \ 1 \ -1] \end{cases}$$

The first modulation vector may be equal to the second modulation vector.

A length of the first modulation vector and a length of the second modulation vector may be 16 when a bandwidth of the transmission channel is 16 MHz. The applying of the first modulation vector to the STF and the one or more duplicated STFs may include sequentially applying an element of the first modulation vector to the one or more duplicated STFs from the STF. The applying of the second modulation vector to the LTF and the one or more duplicated LTFs may include sequentially applying an element of the second modulation vector to the one or more duplicated LTFs from the LTF.

The first modulation vector comprises one of vectors from a following equation.

$$a = \begin{cases} [1\ 1\ 1\ -1\ -1\ -1\ -1\ 1\ -1\ -1\ 1\ -1\ -1\ -1\ 1\ -1] \\ [1\ -1\ 1\ 1\ 1\ -1\ 1\ 1\ -1\ 1\ 1\ 1\ 1\ -1\ -1\ -1] \\ [-1\ 1\ -1\ -1\ -1\ 1\ -1\ -1\ 1\ -1\ -1\ -1\ -1\ 1\ 1\ 1] \\ [-1\ -1\ -1\ 1\ 1\ 1\ 1\ -1\ 1\ 1\ -1\ 1\ 1\ 1\ -1\ 1] \\ [1\ -1\ 1\ 1\ -1\ 1\ -1\ -1\ -1\ 1\ 1\ 1\ -1\ 1\ 1\ 1] \\ [-1\ 1\ -1\ -1\ 1\ -1\ 1\ 1\ 1\ -1\ -1\ -1\ 1\ -1\ -1\ -1] \\ [1\ 1\ 1\ -1\ 1\ 1\ 1\ -1\ -1\ -1\ 1\ -1\ 1\ 1\ -1\ 1] \\ [-1\ -1\ -1\ 1\ -1\ -1\ -1\ 1\ 1\ 1\ -1\ 1\ -1\ -1\ 1\ -1] \end{cases}$$

The second modulation vector comprises one of vectors from a following equation.

$$b = \begin{cases} [1\ 1\ 1\ -1\ -1\ -1\ -1\ 1\ -1\ -1\ 1\ -1\ -1\ -1\ 1\ -1] \\ [1\ -1\ 1\ 1\ 1\ -1\ 1\ 1\ -1\ 1\ 1\ 1\ 1\ -1\ -1\ -1] \\ [-1\ 1\ -1\ -1\ -1\ 1\ -1\ -1\ 1\ -1\ -1\ -1\ -1\ 1\ 1\ 1] \\ [-1\ -1\ -1\ 1\ 1\ 1\ 1\ -1\ 1\ 1\ -1\ 1\ 1\ 1\ -1\ 1] \end{cases}$$

In another aspect, a wireless device for operating in wireless LAN systems includes a transceiver configured to transmit and receive a radio signal, and a processor functionally connected to the transceiver and configured to generate a short training field (STF) for a first channel, generate a long training field (LTF) for the first channel, duplicate the STF on at least one second channel, duplicate the LTF on at least one second channel, transmit the STF and the one or more duplicated STFs through a transmission channel, transmit the LTF and the one or more duplicated LTFs through the transmission channel, and transmit a data field through the transmission channel.

In the method for transmitting data units according to an embodiment of the present invention, the STF (Short Training Field) and the LTF (Long Training Field) included in the data units are duplicated at least once by using 1 MHz bandwidth as a unit band and are transmitted through a bandwidth of at least 1 MHz. Accordingly, a station supporting 1 MHz transmission/reception may receive and interpret STF and LTF of data units transmitted by a station supporting transmission/reception of a bandwidth of 1 MHz or greater to recognize a channel use situation.

In the method for transmitting data units according to an embodiment of the present invention, a modulation vector is applied to the STF and the LTF which are duplicated and transmitted based on a unit bandwidth. Accordingly, the STF and the LTF is duplicated with at least one 1 MHz band and transmitted so that performance degradation of a PAPR (Peak to Average Power Ratio) may be reduced, and a service quality of a wireless LAN system can be improved.

BRIEF DESCRIPTION OF THE DRAWINGS

FIGS. 13, 14 and 15 are diagrams illustrating another examples of a method of transmitting PPDU according to an embodiment of the present invention.

DESCRIPTION OF EXEMPLARY EMBODIMENTS

Figure 1:
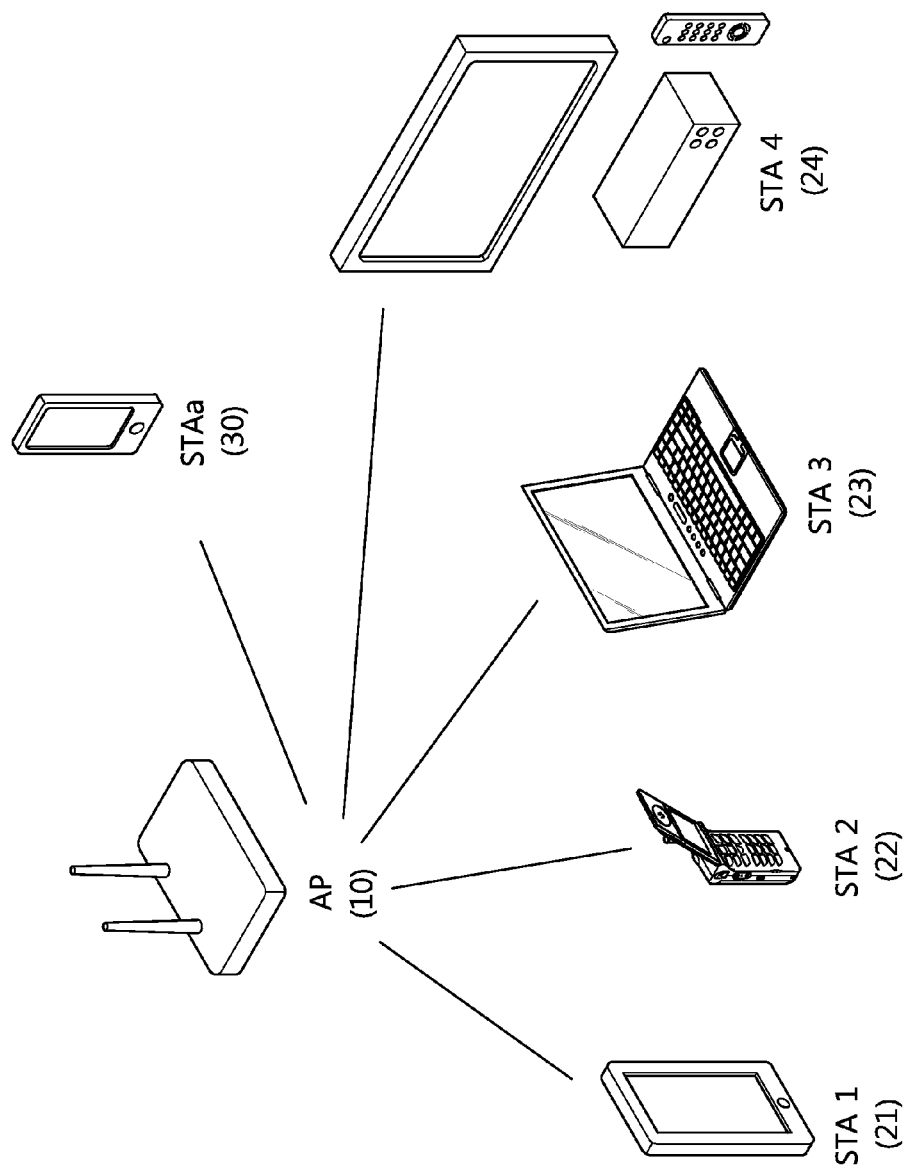
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1 21, non-AP STA2 22, non-AP STA3 23, non-AP STA4 24, and non-AP STAa 30), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| Order | Information |
|---|---|
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Figure 2:
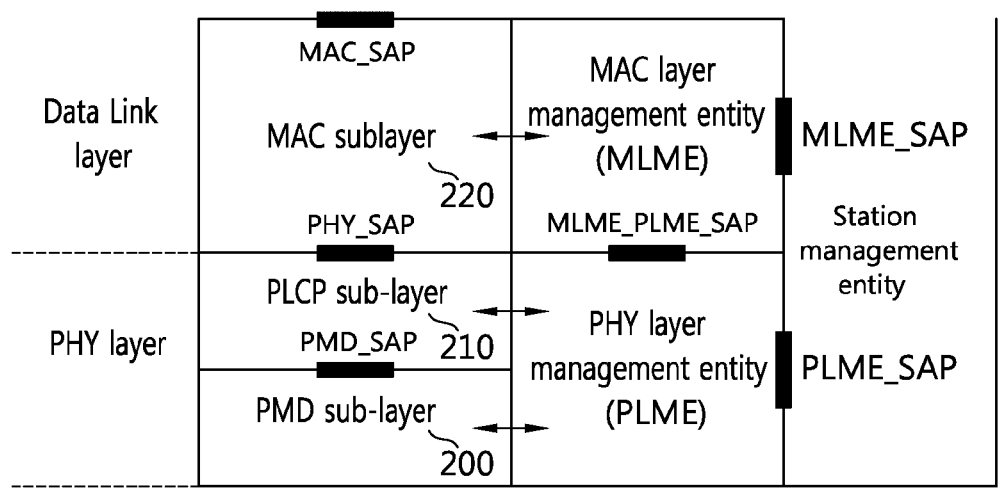
FIG. 2 is a diagram illustrating physical layer architecture of a wireless LAN system supported by IEEE 802.11.

FIG. 2 is a diagram illustrating physical layer architecture of a wireless LAN system supported by IEEE 802.11.

The PHY architecture of IEEE 802.11 includes a PLME (PHY Entity Management Entity), a PLCP (Physical Entity Convergence Procedure) sub-layer 210, and a PMD (Physical Medium Dependent) sub-layer 200. The PLME cooperates with the MLME (MAC Layer Management Entity) to provide a management function of the physical layer. The PLCP sub-layer 210 transfers an MPDU (MAC Protocol Data Unit) received from the MAC sub-layer 220 or transfers a frame provided from the PMD sub-layer 200 to the MAC sub-layer 220 according to instruction of an MAC layer between the MAC sub-layer 220 and the PMD sub-layer 200. The PMD sub-entity 200 is a PLCP lower entity to enable transmission/reception of a physical layer entity between two stations through a wireless medium is possible. The MPDU transferred from the MAC sub-layer 220 is called a PSDU (Physical Service Data Unit) at the PLCP sub-layer 210. Although the MPDU is similar to the PSDU, A-MPDU (aggregated MPDU) obtained by aggregating a plurality of MPDUs is transferred, each MPDU may be different from each PSDU.

The PLCP sub-layer 210 adds an additional field including necessary by a physical layer transceiver during a procedure of receiving the PSDU from the MAC sub-layer 220 and transferring the PSDU to the PMD sub-layer 200. In this case, the additional field may include tail bits necessary to return a PLCP preamble, a PLCP header, and a convolution encoder to a zero state. The PLCP sub-layer 210 receives a TXVECTOR parameter including control information necessary to generate and transmit the PPDU and control information necessary when a reception STA receives and interprets the PPDU from a MAC sub-layer. The PLCP sub-layer 210 uses information included in a TXVECTOR parameter when generating a PPDU including a PSDU.

The PLCP preamble enables a receiver to prepare a synchronizing function and antenna diversity before transmitting the PSDU. The data field may include padding bits, a service field including a bit sequence for initializing a scrambler, and a coded sequence to which a bit sequence is encoded as well as the PSDU. In this case, tail bits are attached to the bit sequence. In this case, an encoding scheme may be selected as one of BCC (Binary Convolutional Coding) encoding or LDPC (Low Density Parity Check) encoding according to an encoding scheme supported from an STA receiving the PPDU. The PLCP header includes a field having information on a PPDU (PLCP Protocol Data Unit) to be transmitted. This will be described in detail with reference to FIGS. 3 to 5 later.

In the PLCP sub-layer 210, a PPDU (PLCP Protocol Data Unit) is generated by adding the above filed to the PSDU and the generated PPDU is transmitted to a reception station through the PMD sub-layer. The reception station receives the PPDU to obtain and restore information necessary to restore data from a PLCP preamble and a PLCP header. A PLCP sub-layer of the reception station transfers an RXVECTOR parameter including PLCP preamble and control information included in a PLCP header to an MAC sub-layer so that a PPDU may be interpreted and data may be acquired in a reception state.

Figure 3:
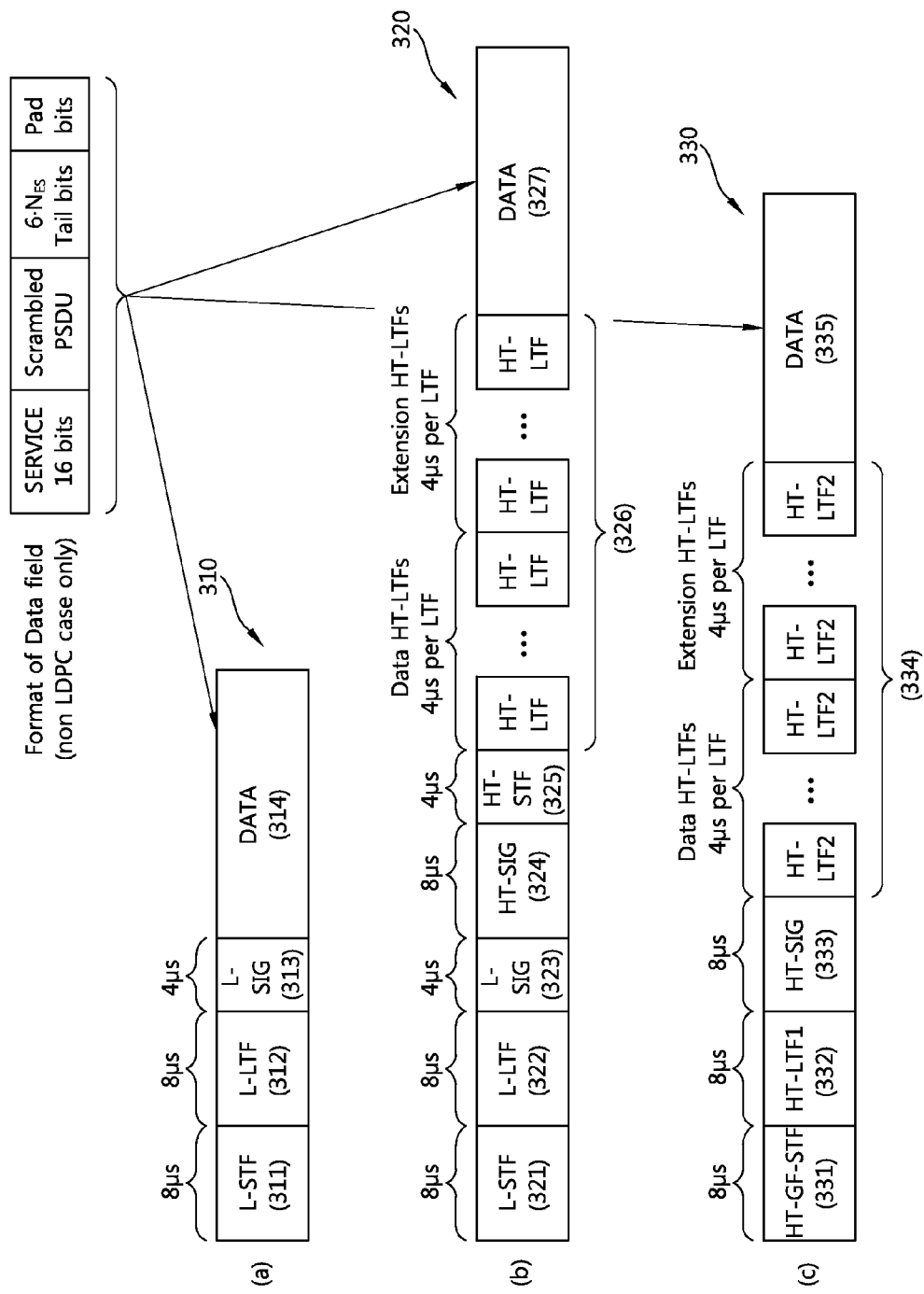
FIGS. 3 and 4 are block diagrams illustrating a PPDU format used in a wireless LAN system according to an embodiment of the present invention.
Figure 4:
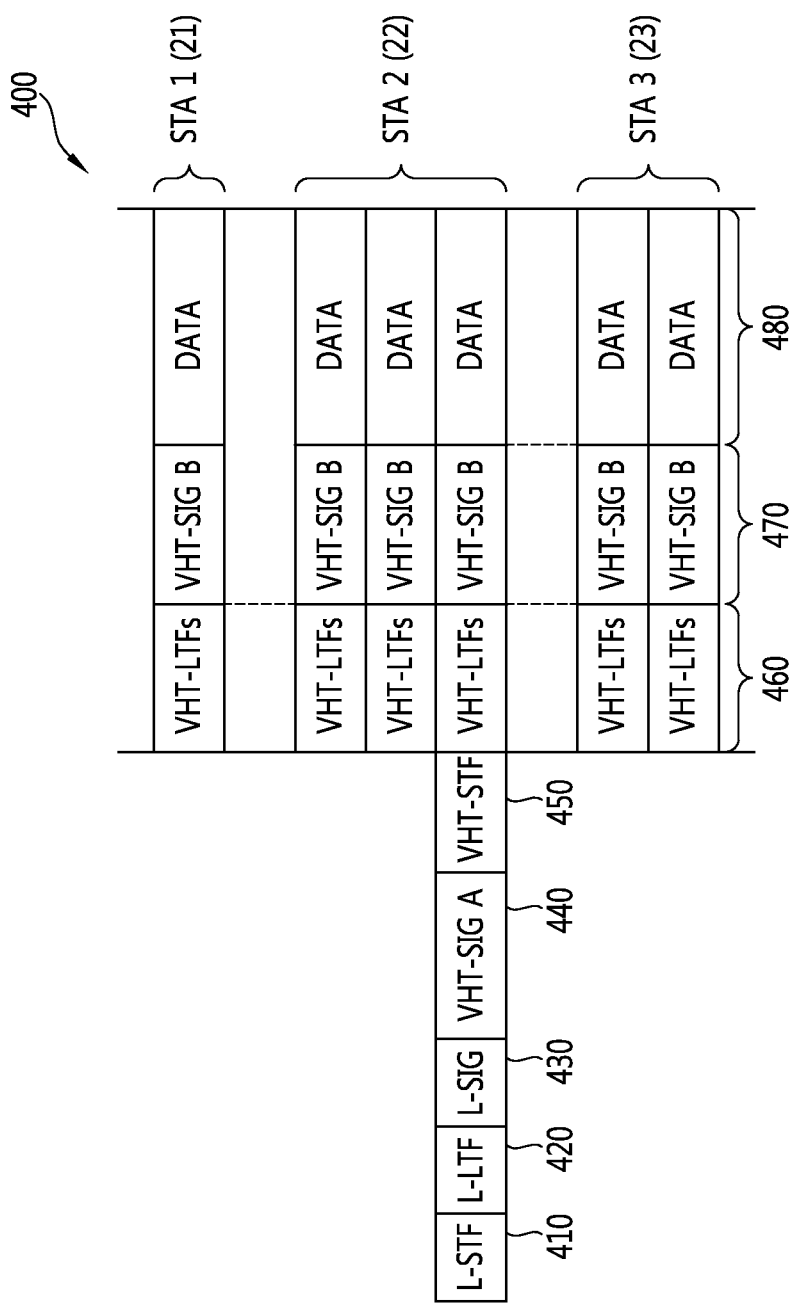

FIGS. 3 and 4 are block diagrams illustrating a PPDU format used in a wireless LAN system according to an embodiment of the present invention. Hereinafter, an STA operating in a legacy wireless LAN system based on IEEE 802.11a/b/g which is a conventional wireless LAN standard before IEEE 802.11n refers to "Legacy STA (L-STA)". Further, an STA capable of supporting an HT based on IEEE 802.11n by an HT wireless LAN system refers to an HT-STA.

A subfigure (a) of FIG. 3 illustrates a Legacy PPDU (L-PPDU) which is a PPDU used in IEEE 802.11a/b/g being an existing wireless LAN system standard before IEEE 802.11n. Accordingly, in the HT wireless LAN system to which the IEEE 802.11n standard is applied, the legacy STA (L-STA) may transmit and receive an L-PPDU having the above format.

Referring to subfigure (a), the L-PPDU 310 includes an L-STF 311, an L-LTF 312, an L-SIG field 313, and a data field 314.

The L-STF 311 is used for frame timing acquisition, AGC (Automatic Gain Control) convergence, coarse frequency acquisition, and the like.

The L-LTF 312 is used for frequency offset and channel estimation.

The L-SIG field 313 includes control information to demodulate and decode the data field 314.

The L-PPDU may be transmitted in the order of the L-STF 311, the L-LTF 312, the L-SIG field 313, and the data field 314.

A subfigure (b) of FIG. 3 is a block diagram illustrating an HT-mixed PPDU format so that the L-STA and the HT-STA may coexist. Referring to FIG. 3(b), the HT-mixed PPDU 320 includes an L-STF 321, an L-LTF 322, an L-SIG 323, an HT-SIG 324, an HT-STF 325, a plurality of HT-LTFs 326, and a data field 327.

The L-STF 321, the L-LTF 322, and the L-SIG field 323 have the same functions as those of reference numerals 311, 312, and 313 of FIG. 3(a), respectively. Accordingly, even if the L-STA receives the HT-mixed PPDU 320, the L-STA may interpret a data field through the L-LTF 322, the L-LTF 322, and the L-SIG 323. However, the L-LTF field 323 may further include information to estimate a channel to be performed when the HT-STA receives the HT-mixed PPDU 320 and interprets an L-SIG field 323, an HT-SIG 324, and an HT-STF 325.

The HT-STA may recognize that the HT-mixed PPDU 320 is a PPDU through an HT-SIG 324 after the L-SIG 323, and may demodulate and decode the data field 327 based on this.

The HT-STF 325 may be used for frame timing synchronization for the HT-STA and AGC convergence, and the like.

The HT-LTF 326 may be used to estimate the channel for demodulating the data field 327. Since the IEEE 802.11n supports an SU-MIMO, a plurality of HT-LTFs 326 may be configured to estimate the channel with respect to each data field transmitted to a plurality of space streams.

The HT-LTF 326 may include a Data HT-LTF used to estimate a channel with respect to a space stream and an extension HT-LTF additionally used for full channel sounding. Accordingly, a plurality of HT-LTFs 326 may be equal to or greater than the number of a transmitted space stream.

The HT-mixed PPDU 320 firstly transmits the L-STF 321, the L-LTF 322, and the L-SIG field 323 to receive L-STA and to acquire data. Next, the HT-SIG field 324 is transmitted for demodulation and decoding of the data to be transmitted for the HT-STA.

The L-STA and the HT-STA may receive a corresponding PPDU to acquire data by transmitting the HT-SIG field 324 without performing beam-forming. Next, the HT-STF 325, the HT-LTF 326, and the data field 327 are transmitted in a wireless scheme through pre-coding.

The STA receiving the signal through pre-coding transmits an HT-STF 325 to consider a part in which power by pre-coding is changed and then transmits a plurality of HT-LTFs 326 and the data field 327. In the HT wireless LAN system, although an HT-STA uses 52 data sub-carriers per OFDM symbol, an L-STA using the same 20 MHz also uses 48 data sub-carriers per OFDM symbol. In order to support backward compatibility with an existing system, since the HT-SIG 324 is decoded in the HT-mixed PPDU 320 format using an L-LTF 322, the HT-SIG field 324 includes (48×2) data sub-carriers. Next, an HT-STF 325 and an HT-LTF 426 include 52 data sub-carriers per OFDM symbol. As a result, since the HT-SIG field 324 is supported with ½, BPSK (Binary Phase Shift Keying), each HT-SIG field 324 includes 24 bits so that each HT-SIG field 324 is transmitted with a total of 48 bits. That is, channel estimation for an L-SIG field 323 and an HT-SIG field 324 uses the L-LTF 322, and a bit string constituting the L-LTF 322 is expressed by a following equation 1. The L-LTF 322 includes 48 data sub-carriers except for a DC sub-carrier per one symbol.

$$L_{-26,26} = \begin{Bmatrix} 1, 1, -1, -1, 1, 1-1, 1, -1, \\ 1, 1, 1, 1, 1, 1, -1, -1, 1, 1, -1, \\ 1, -1, 1, 1, 1, 1, 0, 1, -1, -1, 1, 1, -1, \\ 1, -1, 1-1, -1, -1, -1, -1, 1, \\ 1, -1, -1, 1, -1, 1, -1, 1, 1, 1, 1 \end{Bmatrix} \quad \text{[Equation 1]}$$

A subfigure (c) of FIG. 3 is a block diagram illustrating an HT-Greenfield PPDU 330 usable by only the HT-STA. Referring to the subfigure (c), the HT-GF PPDU 330 includes an HT-GF-STF 331, an HT-LTF1 332, an HT-SIG 333, a plurality of HT-LTF2 334, and a data field 335.

The HT-GF-STF 331 is used for frame timing acquisition and AGC.

The HT-LTF1 332 is used to estimate a channel.

The HT-SIG 333 is used to demodulate and decode the data field 335.

The HT-LTF2 334 is used to estimate a channel for demodulating the data field 335. In the same manner, since the HT-STA uses the SU-MIMO, channel estimation with respect to each data field transmitted to a plurality of space streams is required so that a plurality of HT-LTFs 326 may be configured.

A plurality of HT-LTF2 334 may include a plurality of Data HT-LTFs and a plurality of extension HT-LTFs as in an HT-LTF 326 of the HT-mixed PPDU 320.

As shown in FIGS. 3(a), (b), and (c), each of data fields 314, 327, and 335 may include a service field, a scrambled PSDU, a tail bit, and a padding bit. The service field may be used to initialize the scrambler. The service field may be set to 16 bits. In this case, a bit to initialize the scrambler may be implemented with 7 bits. The tail field may include a bit sequence necessary to return a convolution encoder to a state 0. A bit size in proportion to the number of BCC (Binary Convolutional Code) encoders used to encode data to be transmitted may be assigned to the tail field. In detail, it may be implemented to have 6 bits per the number of BCCs.

FIG. 4 is a diagram illustrating an example of a PPDU format used for a wireless LAN system to support a VHT.

Referring to FIG. 4, a PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

A PLCP sub-layer constituting a PHY is converted into a data field 480 by adding necessary information to a PSDU received from an MAC layer, and adds fields such as the L-STF 410, the L-LTF 420, the L-SIG field 430, the VHT-SIGA field 440, the VHT-STF 450, the VHT-LTF 460, and the VHT-SIGB 470 to generate a PPDU 400, and transmits the PPDU 400 to one or more STAs through a PMD sub-layer. The PLCP sub-layer adds control information necessary to generate the PPDU to the PPDU to transmit the PPDU so that control information used to interpret the PPDU by the reception STA is provided from a TXVECTOR parameter received from a MAC layer.

The L-STF 410 is used for frame timing acquisition, AGC (Automatic Gain Control) convergence, and coarse frequency acquisition.

The L-LTF 420 is used to estimate a channel for demodulating the L-SIG field 430 and the VHT-SIGA field 440.

The L-SIG field 430 is used when the L-STA receives and interprets the PPDU 400 to acquire data. The L-SIG field 430 includes a rate sub-field, a length sub-field, a parity bit, and a tail field. The rate sub-field is set to a value indicating a bit rate with respect to data to be currently transmitted.

The length sub-field is set to a value instructing an octet length of a PSDU requesting to transmit to a PHY layer from an MAC layer. In this case, an L_LENGTH parameter being a parameter associated with information of an octet length of the PSDU is determined based on a TXTIME parameter being a parameter associated with a transmission time. The TXTIME represents a transmission time when a PHY layer determines for PPDU transmission including a PSDU corresponding to a transmission time requested from the MAC layer for transmission of a PSDU (physical service data unit). Accordingly, since an L_LENGTH parameter is a parameter associated with a time, a length sub-field included in the L-SIG field 430 includes information on the transmission time.

The VHT-SIGA field 440 includes control signal or signal information necessary when STAs receiving the PPDU interprets the PPDU 400. The VHT-SIGA field 440 is transmitted with two OFDM symbols. Accordingly, the VHT-SIGA field 440 may be divided into a VHT-SIGA1 field and a VHT-SIGA2 field. The VHT-SIGA1 field includes channel bandwidth information for PPDU transmission, identification information on presence of use of STBC (Space Time Block Coding), information of SU or MU-MIMO instructing a transmitting scheme of a PPDU, information instructing an AP and a transmission target STA group being a plurality of MU-MIMO paired STAs when the transmitting method is MU-MIMO, and information on a space stream assigned to each STA included in the transmission target STA group. The VHT-SIGA2 field includes Short Guard Interval (SGI) relation information.

Information instructing an MIMO transmitting scheme and information instructing the transmission target STA group may be implemented by one MIMO instruction information. For example, the information may be implemented by a group ID. The group ID may be set to a value having a specific range. A specific value of the range indicates an SU-MIMO transmitting scheme. When the PPDU 400 is transmitted in the MU-MIMO transmitting scheme, remaining values may be used as an identification with respect to a corresponding transmission target STA group.

If the group ID indicates that a corresponding PPDU 400 is transmitted in an SU-MIMO transmitting scheme, the VHT-SIGA2 field includes coding instruction information instructing whether a coding scheme applied to a data field is BCC (Binary Convolution Coding) or LDPC (Low Density Parity Check) coding, and MCS (modulation coding scheme) information with respect to a channel between a transmitter and a receiver. Further, the VHT-SIGA2 field may include an AID of a transmission target STA of a PPDU and/or a partial AID including a partial bit sequence of the AID.

If the group ID indicates that a corresponding PPDU 400 is transmitted in an MU-MIMO scheme, the VHT-SIGA field 440 includes coding instruction information indicating whether a coding scheme applied to a data field for transmission to MU-MIMO paired reception STAs is BCC or LDPC coding. In this case, MCS (modulation coding scheme) information with respect to each reception STA may be included in a VHT-SIGB field 470.

The VHT-STF 450 is used to improve performance of AGC estimation in MIMO transmission.

The VHT-LTF 460 is used when the STA estimates an MIMO channel. A next generation wireless LAN system supports the MU-MIMO, the VHT-LTF 460 may be set corresponding to the number of space streams transmitted from the PPDU 400. In addition, full channel sounding is supported. When the full channel sounding is supported, the number of VHT LTFs may be increased.

The VHT-SIGB field 470 includes dedicated control information necessary when a plurality of MIMO paired STAs receive the PPDU 400 to acquire data. Accordingly, only when control information included in the VHT-SIGA field 440 indicates that a currently received PPDU 400 is MU-MIMO transmitted, the STA may be designed to decode the VHT-SIGB field 470. In contrast, when control information included in the VHT-SIGA field 440 indicates that a currently received PPDU 400 is for a single STA, the STA may be designed not to decode the VHT-SIGB field 470.

The VHT-SIGB field 470 may include information on MCS (modulation and coding scheme) with respect to respective STAs and information on rate-matching. The VHT-SIGB field 470 may include information indicating a PSDU length included in a data field for each STA. The information indicating a length of the PSDU is information indicating a length of a bit sequence of the PSDU and may be indicated as an octet unit. Meanwhile, when the PPDU is SU transmitted, information on an MCS is included by a VHT-SIGA field 440, but may not be included in the VHT-SIGB field 470. A size of the VHT-SIGB field 470 may be changed according to a type (MU-MIMO or SU-MIMO) of MIMO transmission and a channel bandwidth used for PPDU transmission.

The data field 480 includes data in which transmission to an STA is intended. The data field 480 includes a PSDU (PLCP Service Data Unit) to which a MPDU (MAC Protocol Data Unit) at an MAC layer is transferred, a service field to initialize a scrambler, a tail field including a bit sequence necessary to return a convolution encoder to a zero state, and padding bits to regulate a length of a data field. In a case of MU transmission, transmission intended data unit may be included in a data field 480 transmitted to each STA, and the data unit may be A-MPDU (aggregate MPDU).

Fields included in each PPDU format shown in FIGS. 3 and 4 may be transmitted as an OFDM symbol through processing of a physical layer. Particularly, a data sequence constituting the data field may be transmitted as at least one data OFDM symbol according to a size thereof. Further, due to a wireless channel state, time synchronization mismatch between a transmitter and a receiver, and interference between symbols, normal generation, transmission, reception, and interpretation of a data OFDM symbol may be interfered. In order to prevent this, a Guard Interval (GI) is applied to a data OFDM symbol so that an abnormal operation may be prevented so that transmission/reception of data having high reliability may be ensured. Further, in an HT wireless LAN system and a VHT wireless LAN system, an SGI is applied so that a consumption time due to a guard interval may be reduced to ensure more efficient transmission/reception. In the HT wireless LAN system and the VHT wireless LAN system, presence of application of an SGI may be instructed in the signal field and the VHT-SIG A.

As shown in FIG. 1, in a wireless LAN system, when the AP 10 transmits data to an STA1 21, an STA2 22, and an STA3 23, the AP 10 may transmit a PPDU to an STA group with the STA1 21, the STA2 22, the STA3 23, and the STA4 24. In this case, as shown in FIG. 4, a space stream may not be assigned to an STA4 24, a specific number of space streams are assigned to the STA1 21, the STA2 22, and the STA3 23 so that the data may be transmitted. In an example of FIG. 4, one space stream may be assigned to an STA1 21, three space streams may be assigned to an STA2 22, and two space streams may be assigned to an STA3 23.

Meanwhile, in recent years, as various communication services such as smart grid), e-Health, and Ubiquitous are introduced, a M2M (Machine to Machine) technology to support this has been spotlighted. A sensor to detect a temperature and humidity, home appliance such as a camera and a TV, a process machine at a factory, and large machines such as a car may be one element to configure an M2M system. Elements to configure an M2M system may transmit and receive data based on WLAN communication. When devices configuring the M2M system support a WLAN and configure a network and refers to an M2M wireless LAN system.

A characteristic of a wireless LAND system supporting M2M is as follows.

1) a large number of STAs: It is assumed that a large number of STAs are located in a BSS unlike an existing network. A private device and sensors installed at a house or an office are considered. Accordingly, a considerably large number of STAs may be connected to one AP.

Low traffic load per STA: Since an M2M terminal has a traffic pattern to collect and report peripheral information, it is not necessary to often send the traffic load and an amount of information is small.

3) Communication based on uplink: an M2M receives a command with downlink to do action and reports result data to uplink. Since main data is generally transmitted to uplink, uplink becomes a center in a system supporting an M2M.

4) Power management of STA: An M2M terminal is generally operated as a battery and it is difficult for a user to often charge the M2M terminal. Accordingly, a power management method to minimize battery consumption is required.

5) Automatic recovery function: a person has a difficulty in directly operating a device configuring an M2M system at a specific situation, an automatic recovery function is required.

A next generation wireless LAN system standard using the M2M communication as a used example is discussed. A prominent characteristic of the wireless LAN system may have service coverage greater than a diameter of 1 km at an unlicensed band less than a 1 GHz band except for a TV WS band. This means that the wireless LAN system has significantly wide service coverage as compared with a wireless LAN based on an existing indoor. That is, unlike existing 2.4 GHz and 5 GHz, a wireless LAN is operated at a band less than 1 GHz represented as 700~900 MHz, due to a propagation characteristic of a corresponding band, a service coverage of the same transmission power contrast may be extended to about 2 to 3 times. In this case, a significant large number of STAs may be connected per one AP. A used example considered in the next generation wireless LAN may be as follows.

Used example 1. Sensors and meters
1a: smart grid—meter to pole
1c: Environmental/Agricultural Monitoring
1d: Industrial process sensors
1e: Healthcare
1f: Healthcare
1g: Home/Building Automation
1h: Home sensors Used example 2. Backhaul Sensor and meter data
Backhaul aggregation of sensors
Backhaul aggregation of industrial sensors
Used example 3. Extended range Wi-Fi
Outdoor extended range hotspot)
Outdoor Wi-Fi for cellular traffic offloading A case of a sensor and a meter being the used example 1 is a used example regarding the above M2M, and various types of sensor devices are connected to an AP of a wireless LAN system to perform M2M communication. Particularly, in a case of smart grid, maximum 600 sensor devices may be connected to one AP.

A case of a backhaul sensor and data meter being the used example 2 is a case where an AP providing wide coverage serves as a backhaul link of another communication system.

The used example 3 includes a case of being aimed to provide hot spot communication of outdoor extended range such as extended home service coverage, campus service coverage, and shopping mall and a case of being aimed to distribute overloaded cellular traffic because the AP offloads traffic of a cellular mobile communication.

The present invention suggests a format of a data unit for an apparatus operating at a band less than 1 GHz as discussed in a next generation wireless LAN standard. In detail, the present invention suggests a structure of an efficient physical layer preamble for an apparatus operating at a band less than 1 GHz. Hereinafter, a provided data unit, that is, the PPDU may be sequentially transmitted in the form of an OFDM symbol in an inclusion order of the field.

Communication at a band less than 1 GHz has a significantly wide service coverage as compared with a wireless LAN system based on an existing indoor due to a propagation characteristic. To this end, a physical entity (PHY) characteristic in an existing VHT wireless LAN system may be implemented in a $\frac{1}{10}$ down-clocking form. In this case, a 20/40/80/160/80+80 MHz channel bandwidth in a VHT wireless LAN system is provided as a 2/4/8/16/8+8 MHz channel bandwidth at a band less than 1 GHz through $\frac{1}{10}$ downclocking. Accordingly, a Guard Interval (GI) may be increased by 10 times from existing 0.8 us to 8 us. A following table 2 illustrates performance comparison between a physical layer of a VHT wireless LAND system and a physical layer of a wireless LAN system based on a band less than $\frac{1}{10}$ down clocked 1 GHz.

TABLE 2

| VHT wireless LAN system PHY | | Wireless LAN system PHY based on band less than $\frac{1}{10}$ downclocked 1 GHz | |
|---|---|---|---|
| Channel bandwidth | Processing rate | Channel bandwidth | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Hereinafter, as an example, the following is one OFDM 1 symbol duration is 40 us on the assumption that a PHY characteristic of the VHT wireless LAN system is $\frac{1}{10}$ downclocked for convenience of a description. A range of an embodiment of the present invention is not limited to a specific numeric range.

Figure 5:
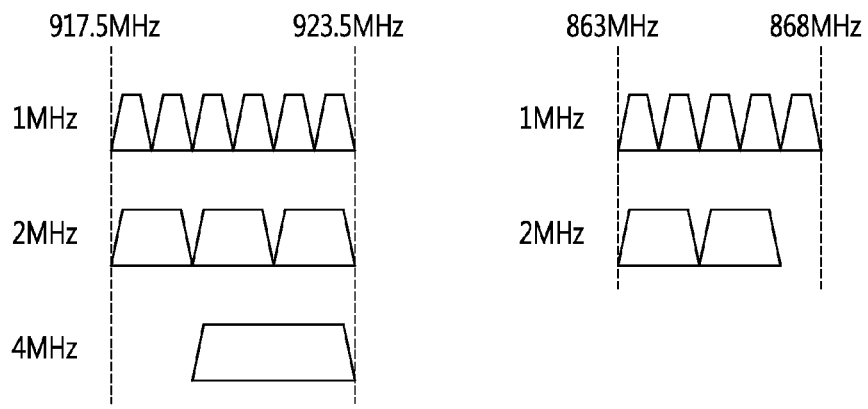
FIGS. 5 and 6 are diagrams illustrating an example of a used channel in a next generation wireless LAN system according to an embodiment of the present invention.
Figure 6:
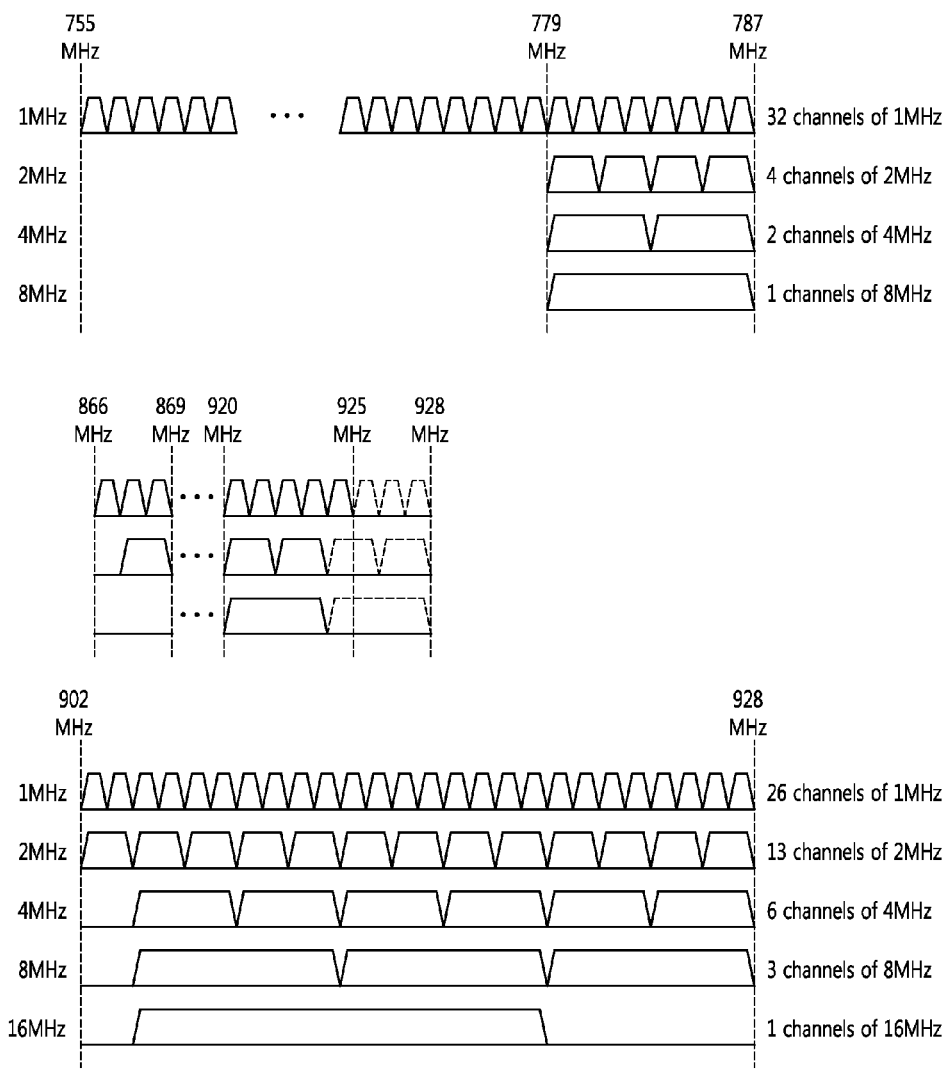

FIGS. 5 and 6 are diagrams illustrating an example of a used channel in a next generation wireless LAN system according to an embodiment of the present invention.

It is assumed that the AP and an STA fundamentally support 1 MHz and 2 MHz bandwidths at a band of 1 GHz or less. It is assumed that 4 MHz, 8 MHz, 16 MHz, and 8+8 MHz bandwidths may be supported in a case of specific AP and/or STA.

Since an existing previously considered legacy device is not located at a band of 1 GHz or less, it may be important to efficiently apply a PHY preamble to a maximum 1 GHz or less without considering back ward compatibility. When considering the above point, a PPDU format as shown in FIG. 6 is suggested.

Figure 7:
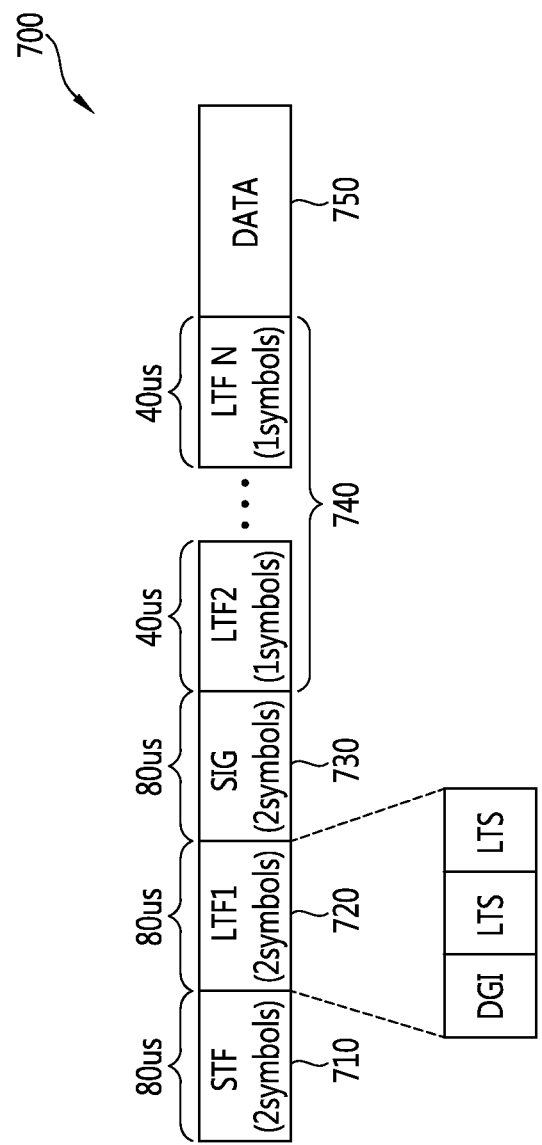
FIG. 7 is a block diagram illustrating an example of a PPDU format for transmission through a band of 1 GHz or less according to an embodiment of the present invention.

FIG. 7 is a block diagram illustrating an example of a PPDU format for transmission through a band of 1 GHz or less according to an embodiment of the present invention.

Referring to FIG. 7, the PPDU 700 has a structure obtain by 1/10 downclocking an HT-GF PPDU format as shown in FIG. 3(c). The PPDU 700 includes an STF 710, an LTF1 720, an SIG field 730, at least one LTF2 740, and a data field 750.

The STF 710 is used for frame timing acquisition and AGC. The STF 710 includes 2 OFDM symbols, and has OFDM symbol duration of 80 us by summing two 40 us.

The LTF1 720 is used to estimate a channel. The LTF1 720 includes 2 OFDM symbols, and has OFDM symbol duration of 80 us by summing two 40 us. The LTF1 620 includes a DGI (Double Guard Interval) and two LTSs (Long Training Symbols).

The SIG field 730 is used to demodulate and decode the data field 740. The SIG field 730 includes 2 OFDM symbols, and has OFDM symbol duration of 80 us by summing two 40 us.

At least one LTF 740 is used to estimate a channel for demodulating the data field 750. Each LTF includes one OFDM symbol, and has OFDM symbol duration of 40 us.

As shown in FIG. 7, when a PPDU of a format is transmitted, it takes a total of 160 us to transmit the SIG field 730. A PPDU of the format may be used to transmit a channel bandwidth of 2 MHz or greater.

Figure 8:
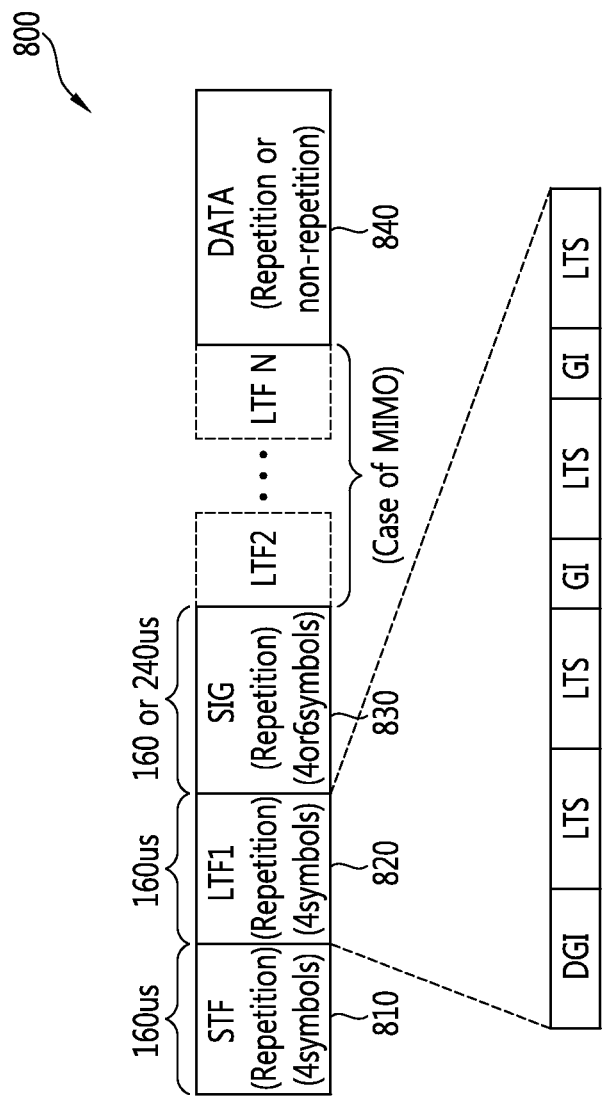
FIG. 8 is a block diagram illustrating an example of a PPDU formation for 1 MHz transmission at a band of 1 GHz of less according to an embodiment of the present invention.

Meanwhile, for communication of extended coverage, there has been suggested a PPDU format as shown in FIG. 8 where each STF, LTF, SIG, and/or data fields included in a PPDU of a format as shown in FIG. 7 are repeated on a time of twice of greater and a frequency axis.

FIG. 8 is a block diagram illustrating an example of a PPDU formation for 1 MHz transmission at a band of 1 GHz of less according to an embodiment of the present invention.

Referring to FIG. 8, the PPDU 800 may include an STF 810, an LTF1 820, an SIG field 830, and a data field 840. In addition, a PPDU for MIMO transmission may further include at least one LTF (LTF2 to LTF N) according to the number of used space streams.

Referring to STF 810 and LTF1 820, as compared with the STF 810 and the LTF1 820 of FIG. 7, an OFDM symbol is repeatedly formed. That is, respective OFDM symbol(s) composed of a bit sequence fundamentally constituting an STF and an LTF1 are repeated.

Accordingly, the STF 810 includes 4 OFDM symbols, and has OFDM symbol duration of 160 us by summing four 40 us. The LTF1 820 includes 4 OFDM symbols, and has OFDM symbol duration of 160 us by summing four 40 us. That is, when a PPDU as shown in FIG. 8 is provided, a time of twice elapses as compared with when a transmission time of a preamble part is 320 us and a PPDU of a format as shown in FIG. 7 is transmitted.

Further, an OFDM symbol may be repeatedly formed at an SIG field 830, and the SIG field 830 may be repeatedly formed at least twice.

Meanwhile, repetition of an OFDM symbol may be or may not be applied to a data field 840. Whether repletion of an OFDM symbol is applied to the data field 840 may be implemented in an SIG field 830 through a specific indication field. The specific indication field may be implemented by an MCS sub-field indicating MCS (Modulation and Coding Scheme) applied to the data field 840. When the MCS sub-field indicates that an MCS of the lowest level is applied to a data field, it may be implemented so that repletion of the OFDM symbol is applied to the data field 840.

As shown in FIG. 8, a PPDU format to which repletion of the OFDM symbol is applied may be used to transmit/receive a frame for wider service coverage by using a channel bandwidth of 1 MHz.

Figure 9:
FIG. 9 is a diagram illustrating a transmission structure of a PPDU according to an embodiment of the present invention.
Figure 9:

Transmission structures of a PPDU for a bandwidth of 2 MHz of a format as shown in FIG. 7 and a PPDU for a bandwidth of 1 MHz as shown in FIG. 8 may be implemented as shown in FIG. 9.

FIG. 9 is a diagram illustrating a transmission structure of a PPDU according to an embodiment of the present invention.

Referring to FIG. 9, 32-point FET (Fast Fourier Transform) according to a bandwidth of 1 MHz may be applied to a PPDU for a bandwidth of 1 MHz to be transmitted. 64-point FET (Fast Fourier Transform) according to a bandwidth of 2 MHz may be applied to a PDU for a bandwidth of 2 MHz to be transmitted. The point number of the FET may be determined according to the number of sub-carriers according to a bandwidth.

Since the AP and the STA fundamentally supports 1 MHz and 2 MHz in a next generation wireless LAN system, 1 MHz based operation may be performed at a specific BSS and 2 MHz based operation may be performed at another BSS. In this case, an environment in which BSS based on different bandwidths and/or band operation coexists may be provided.

Figure 10:
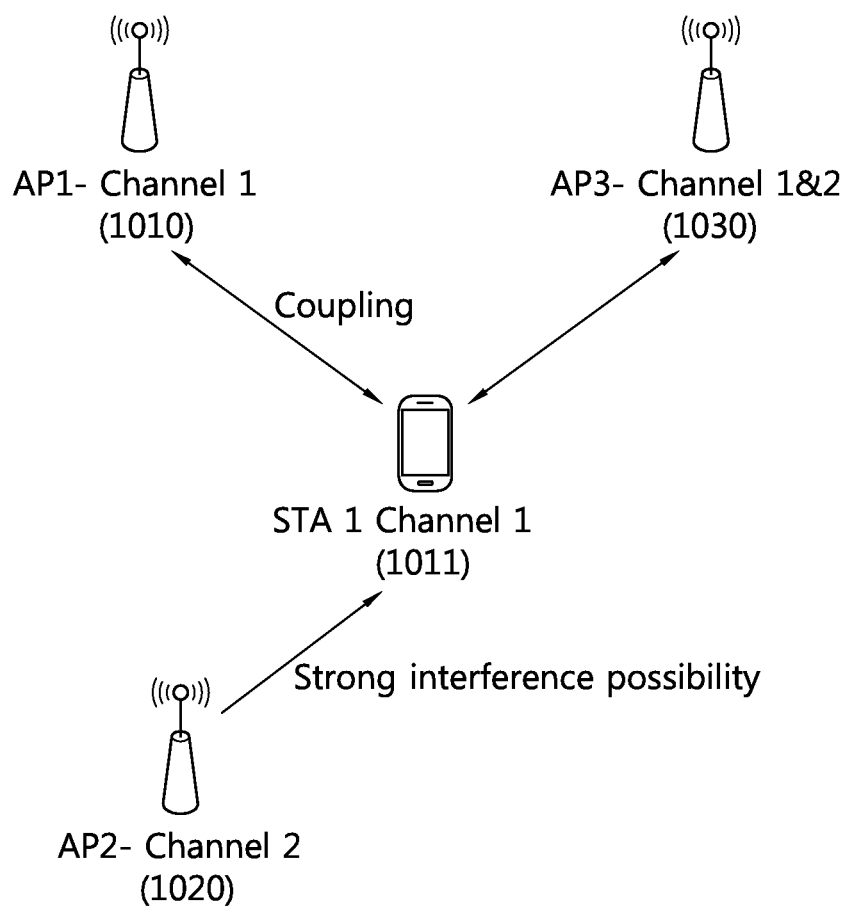
FIG. 10 is a diagram illustrating an example of a wireless LAN environment according to an embodiment of the present invention.

FIG. 10 is a diagram illustrating an example of a wireless LAN environment according to an embodiment of the present invention.

Referring to FIG. 10, a BSS1 managed by AP 1 1010 is operated with a channel 1 of a bandwidth of 1 MHz. A BSS2 managed by AP 2 1020 is operated with a channel 2 of a bandwidth of 1 MHz. A BSS3 managed by AP 3 1030 is operated with the channel 1 and the channel 2, that is, a total of a bandwidth of 2 MHz. In this case, the channel 1 and the channel 1 are adjacent to each other, and it is assumed that the channel 1 is an upper 1 MHz bandwidth channel. The STA1 1011 may be combined with AP1 to exchange data with the AP through a channel 1 of a bandwidth of 1 MHz.

In an OBSS environment configured as shown in FIG. 10, the STA may receive an interference signal from other BSSs, for example, the AP 2 1020 and/or the AP 3 1030. Accordingly, in the above OBSS environment, the STA1 1011 may automatically detect the transmitted/received signal from the AP 2 1020 and the AP 3 1030 to perform a CCA operation.

If RF front-end is not suitably tuned to 2 MHz when scanning a signal of an AP 3 1030 transmitted/received to a channel of a bandwidth of 2 MHz, the STA1 1011 operated with the channel 1 receives, demodulates, and decodes a signal of an AP3 1030 transmitted to a channel of a bandwidth of 2 MHz so that a uninterpretable problem may occur.

As described above, when the problem occurs, an STA operated with 1 MHz cannot obtain a normal result when the STA performs a CCA with respect to transmission of an STA and/or an AP operated with a bandwidth of 2 MHz or greater.

Accordingly, there is a need to consider a method capable of performing the CCA based on a 1 MHz transmission structure being a minimum unit of transmission.

Figure 11:
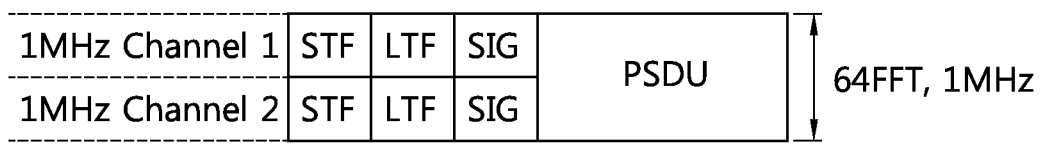
FIG. 11 is a diagram illustrating an example of a method of transmitting a 2 MHz PPDU according to an embodiment of the present invention.

FIG. 11 is a diagram illustrating an example of a method of transmitting a 2 MHz PPDU according to an embodiment of the present invention.

Referring to FIG. 11, when transmitting a PPDU for a bandwidth of 2 MHz, STF, LTF, and SIG fields are transmitted through a bandwidth of 1 MHz. In this case, transmission of the STF, LTF, and SIG fields through a channel 1 of a bandwidth of 1 MHz is duplicated on a channel 2 of a bandwidth of 1 MHz. This transmits the STF, LTF, and SIG fields with a bandwidth of 1 MHz so that an STA and/or an AP operated with 1 MHz may normally sense regardless of a bandwidth served by another BSS. An STA operated with 1 MHz may receive a transmitted PPDU as shown in FIG. 11 to perform synchronization and estimate a channel through the STF and the LTF, and it may be understood that a transmission bandwidth of a corresponding PPDU through the SIG field is 2 MHz.

In a PPDU transmitting scheme as shown in FIG. 11, for easy description, a guard band between STFs, LTFs, and SIGs transmitted through the channel 1 and the channel 2 is not shown. At least one STF and/or LTF for AGC (Automatic Gain Convergence) and channel estimation may be added to a PSDU front-end. Since the STF, LTF, and SIG fields through each 1 1 MHz in 2 MHz are transmitted by duplicated transmission, a configuration thereof may be equally set.

Figure 12:
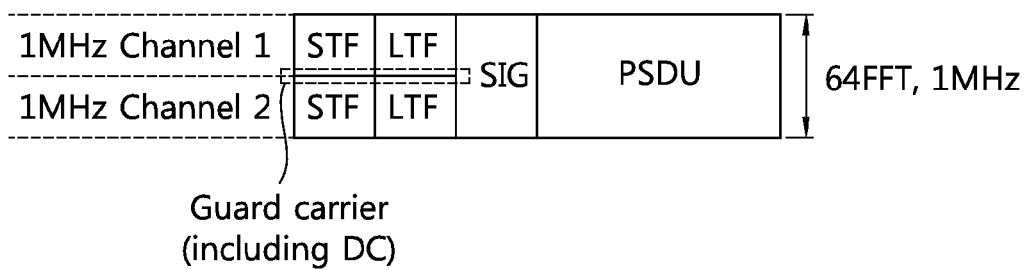
FIG. 12 is a diagram illustrating another example of a method of transmitting 2 MHz PPDU according to an embodiment of the present invention.

FIG. 12 is a diagram illustrating another example of a method of transmitting 2 MHz PPDU according to an embodiment of the present invention.

Referring to FIG. 12, when transmitting a PPDU for a bandwidth of 2 MHz, the STF and the LTF are transmitted with 1 MHz being a minimum bandwidth unit. In this case, transmission of the STF and the LTF through a channel 1 of a bandwidth of 1 MHz is duplicated on a channel 2 of a bandwidth of 1 MHz. Meanwhile, unlike FIG. 11, the SIG field is transmitted through a 2 MHz band. In this case, a guard carrier may be inserted close to a DC sub-carrier at the SIG field so that an STA operated with 1 MHz may be decoded. Accordingly, even if an upper 1 MHz channel or a lower 1 MHz channel is decoded, the STA may decode an SIG field transmitted with 2 MHz.

Figure 13:
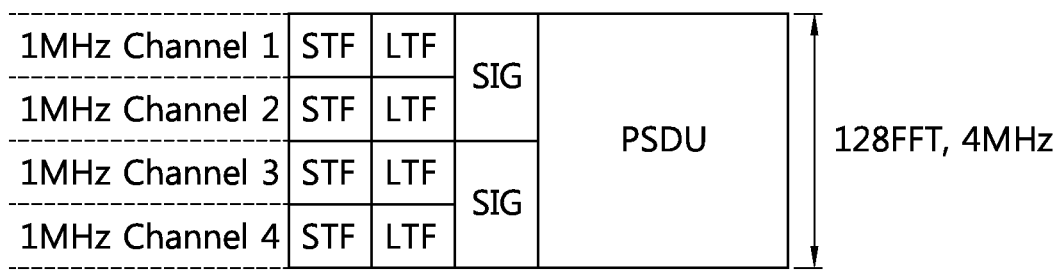
Figure 14:
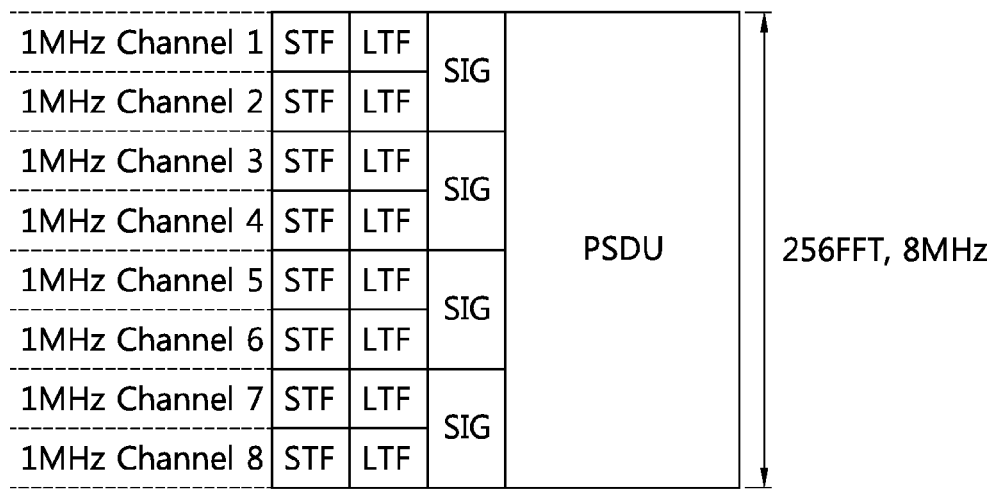

In transmission of the 2 MHz PPDU, a transmission duplication scheme characterized in that 1 MHz transmission of STF, LTF, and SIG fields or 1 MHz transmission of the STF and LTF fields are duplicated on another 1 MHz channel is applicable to a transmitting scheme of a wide band such as 4 MHz, 8 MHz, and 16 MHz. This may be implemented as shown in FIGS. 13 to 15.

When the above transmission duplication scheme is applied, since the STF and the LTF have the same waveform, a PAPR (Peak to Average Power Ratio) value may be increased when the STF and the LTF are converted into a time domain signal. If the PARR value is increased, a back-off value at a non-linearity interval of a Power Amplifier is increased. Upon AGC setting, as a range is increased, resolution may be degraded upon ADC/DAC conversion.

The PAPR relation problem will be described based on STF/LTF sequence at a next generation wireless LAN system. Sequences of the STF and the LTF considered in the next generation wireless LAN system are as follows.

1. STF sequence
tone_index=[−12:4:−4, 4:4:12]
Values: [0.5, −1, 1, −1, −1, −0.5]*(1+j)*y, where y represents a normalization factor
PAPR=0.45 dB
y=2.4 for MCS 0 rep2, 1.7 otherwise
2. LTF sequence
$P_{32}$=[0 0 0 1 −1 1 −1 −1 1 1 −1 1 1 −1 1 1 1 0 −1 −1 −1 1 −1 −1 −1 1 −1 1 1 1 −1 0 0]

The STF and LTF sequences have a PAPR value of 0.4576 dB and a PAPR value of 3.6965 dB, respectively.

Hereinafter, as shown in FIG. 14, 8 MHz PPDU transmission duplicated from 1 MHz STF/LTF transmission is considered. In this case, if the same STF/LTF is transmitted, in a case of 8× oversampling and no pulse shaping, PAPRs at the STF interval and the LTF interval are 9.4708 dB and 12.6308 dB, respectively. This indicates that performance is degraded by increasing the PARP values as compared with an existing case.

Accordingly, when applying the present invention and a transmission duplication scheme, a scheme of applying phase modulation to each unit bandwidth transmission may be suggested. Hereinafter, a sequence of applying optimal modulation to a next generation wireless LAN system environment is proposed. In this case, a modulation set according to the present invention may be modulated and extended to a complex number which may be totally responded. That is, a c*[a0 a1 a2 . . . aN−1] obtained by multiplying the total set [a0 a2 . . . aN−1] by a complex number c may be applied as a modulation set.

In this case, BPSK (Binary Phase Shift Keying) or QPSK (Quadrature Phase Shift Keying) is suitable for the modulated signal by taking complexity into consideration. Since only signal operation on the two signals is performed to obtain a desired result through hardware operation of a flip-flop, complexity of a calculation may be reduced.

Accordingly, for 8 MHz PPDU transmission as shown in FIG. 14, a modulation set [$a_0$ $a_1$ $a_2$ . . . $a_7$] applicable to each STF transmitted to a 1 MHz band may be expressed by a following table 3.

TABLE 3

| $a_0$ | $a_1$ | $a_2$ | $a_3$ | $a_4$ | $a_5$ | $a_6$ | $a_7$ | PAPR [dB] |
|---|---|---|---|---|---|---|---|---|
| 1 | 1 | −1 | −1 | −1 | −1 | 1 | −1 | 2.63110657205562 |
| −1 | −1 | 1 | 1 | 1 | 1 | −1 | 1 | 2.63110657205562 |
| 1 | −1 | 1 | 1 | 1 | 1 | −1 | −1 | 2.63110657205562 |
| −1 | 1 | −1 | −1 | −1 | −1 | 1 | 1 | 2.63110657205562 |
| 1 | −1 | −1 | 1 | −1 | 1 | 1 | 1 | 2.63110657205563 |
| −1 | 1 | 1 | −1 | 1 | −1 | −1 | −1 | 2.63110657205563 |
| 1 | 1 | 1 | −1 | 1 | −1 | −1 | 1 | 2.63110657205563 |
| −1 | −1 | −1 | 1 | −1 | 1 | 1 | −1 | 2.63110657205563 |

In addition, a modulation set [$b_0$ $b_1$ $b_2$ . . . $b_7$] applicable to an LTF may be expressed by a following table 4.

TABLE 4

| $b_0$ | $b_1$ | $b_2$ | $b_3$ | $b_4$ | $b_5$ | $b_6$ | $b_7$ | PAPR [dB] |
|---|---|---|---|---|---|---|---|---|
| 1 | 1 | −1 | −1 | −1 | −1 | 1 | −1 | 5.85153824592464 |
| 1 | −1 | 1 | 1 | 1 | 1 | −1 | −1 | 5.85153824592464 |
| −1 | 1 | −1 | −1 | −1 | −1 | 1 | 1 | 5.85153824592464 |
| −1 | −1 | 1 | 1 | 1 | 1 | −1 | 1 | 5.85153824592464 |
| 1 | 1 | 1 | −1 | 1 | −1 | −1 | 1 | 5.87531304301886 |
| −1 | −1 | −1 | 1 | −1 | 1 | 1 | −1 | 5.87531304301886 |
| 1 | −1 | −1 | 1 | −1 | 1 | 1 | 1 | 5.87531304301886 |
| −1 | 1 | 1 | −1 | 1 | −1 | −1 | −1 | 5.87531304301886 |

Meanwhile, a modulation set applicable to an 8 MHz PPDU may be expressed as an 8 bit vector. There may be total 28 types of vector sequences. Among them, a modulation set applied to an STF is 8 types of modulation sets having the lowest PAPR value of about 2.63 dB, which is illustrated in table 2. Further, a modulation set applied to an LTF is 8 types of modulation sets having the lowest PAPR value of about 5.85 dB, which is illustrated in table 3. A description of remaining modulation sets is omitted.

Figure 16:
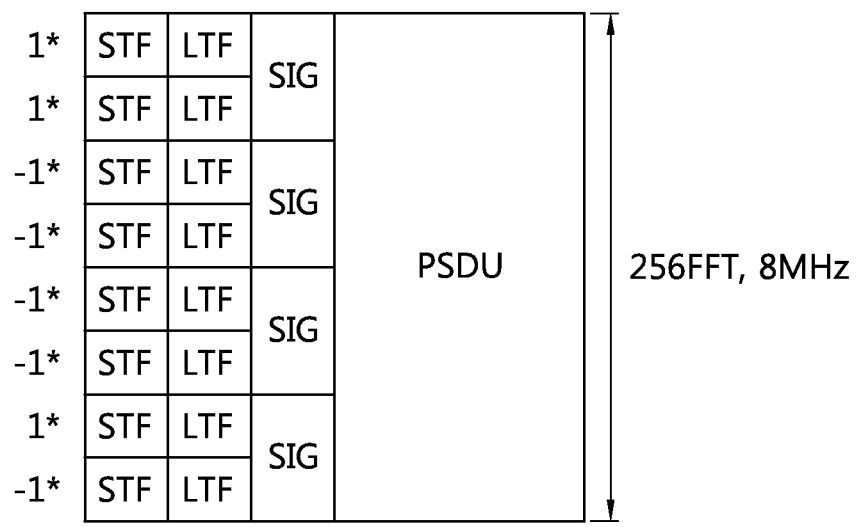
FIG. 16 is a diagram illustrating an example of a PPDU transmission structure to which a modulation set is applied according to an embodiment of the present invention.

Referring to table 3 and table 4, when disclosed modulation sets are applied to the STF and the LTF, all the modulation sets having a low PARP value. Accordingly, one modulation set of table 3 and one modulation set of table 4 are independently applicable to the STF and the LTF. One of the 8 modulation sets is equally applicable to the STF and the LTF. FIG. 16 illustrates an example where a modulation set [1 1 −1 −1 −1 −1 1 −1] is applied to the STF and the LTF.

FIG. 16 is a diagram illustrating an example of a PPDU transmission structure to which a modulation set is applied according to an embodiment of the present invention.

Referring to FIG. 16, an STF and an LTF of each channel band is multiplied by a specific value of the modulation set. This example applies a modulation set vector from an upper frequency to a lower frequency. However, it is apparent that a case where a corresponding modulation set vector is mathematically modulated with the same specific constant or a case where a modulation set vector is applied from a lower frequency to an upper frequency direction being a direction opposite to the lower frequency is equivalent with a scheme of the example.

Further, although a modulation set vector obtaining a minimum PARP may be selected to apply a modulation set vector according to an embodiment of the present invention, a modulation vector set of a next line may be selected due to issue of another implementation.

Meanwhile, a modulation set vector value applicable to an STF and an LTF of 16 MHz PPDU is set to a separate value of length 16. The set modulation set vector value is applicable upon transmission of 16 MHz PPDU. A modulation set $[a_0\ a_1\ a_2\ \ldots\ a_{15}]$ applicable to an STF transmitted through a 1 MHz band to 16 MHz PPDU transmission as shown in FIG. 15 may be expressed by a following table 5.

In the same manner as in a modulation set applicable to 8 MHz PPDU, a modulation set applicable to 16 MHz PPDU may be expressed by a vector of 16 length. There may be total 216 types of vector sequences. Among them, a modulation set applied to an STF is four types of modulation sets having the lowest PARP value of about 12.46 dB, which is listed in table 5. A modulation set applied to an LTF is four types of modulation sets having the lowest PARP value of about 15.64 dB, which is listed in table 6. A description of remaining modulation sets is omitted.

Figure 17:
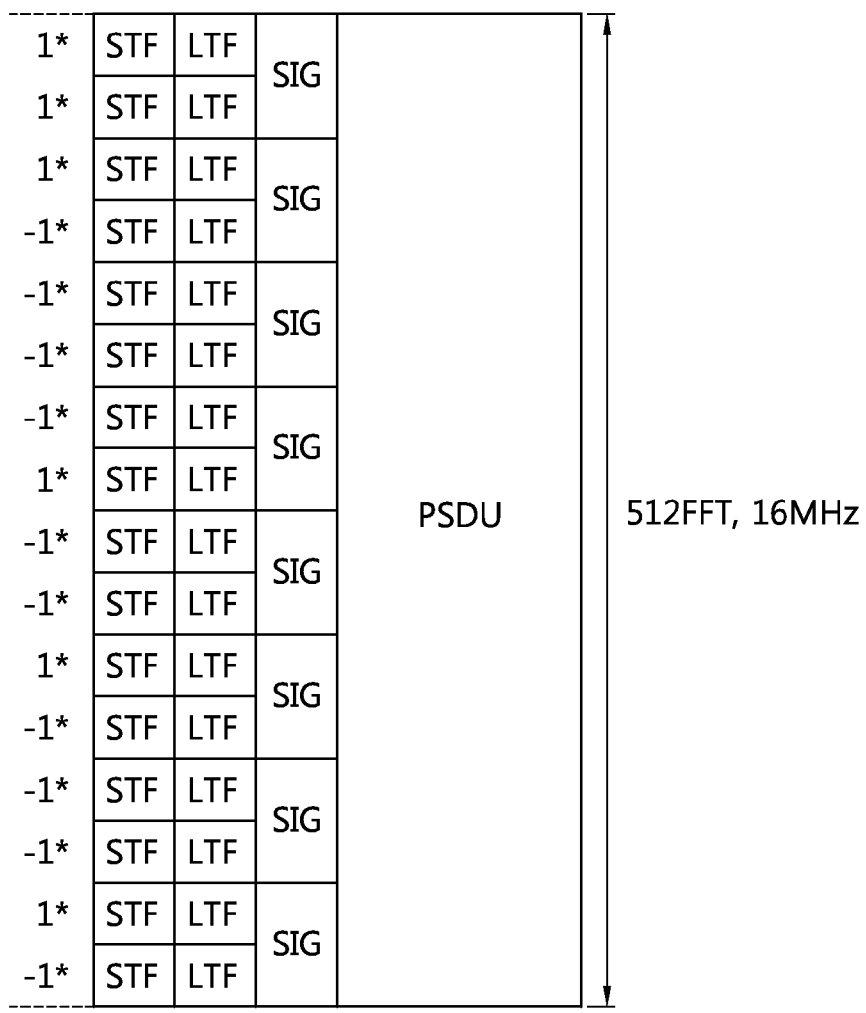
FIG. 17 is a diagram illustrating another example of a PPDU transmission structure to which a modulation set is applied according to an embodiment of the present invention.

Referring to table 5 and table 6, when the listed modulation sets are applied to the STF and the LTF, all the modulation sets have a low PAPR. Accordingly, one modulation set of table 5 and one modulation set of table 6 is independently applicable to the STF and the LTF. One specific modulation set is equally applicable to the STF and the LTF. FIG. 17 illustrates an example where a modulation set [1 1 −1 −1 −1 1 −1 1 1 −1 −1 −1 −1 1 1 −1] is applied to the STF and the LTF.

FIG. 17 is a diagram illustrating another example of a PPDU transmission structure to which a modulation set is applied according to an embodiment of the present invention.

Referring to FIG. 17, a specific value of a modulation set is multiplied by an STF and an LTF of each channel band. This example applies a modulation set vector from an upper frequency to a modulation set vector. However, it is apparent that a case where a corresponding modulation set vector is mathematically modulated with the same specific constant or a case where a modulation set vector is applied from a lower frequency to an upper frequency direction being a direction opposite to the lower frequency is equivalent with a scheme of the example.

Figure 18:
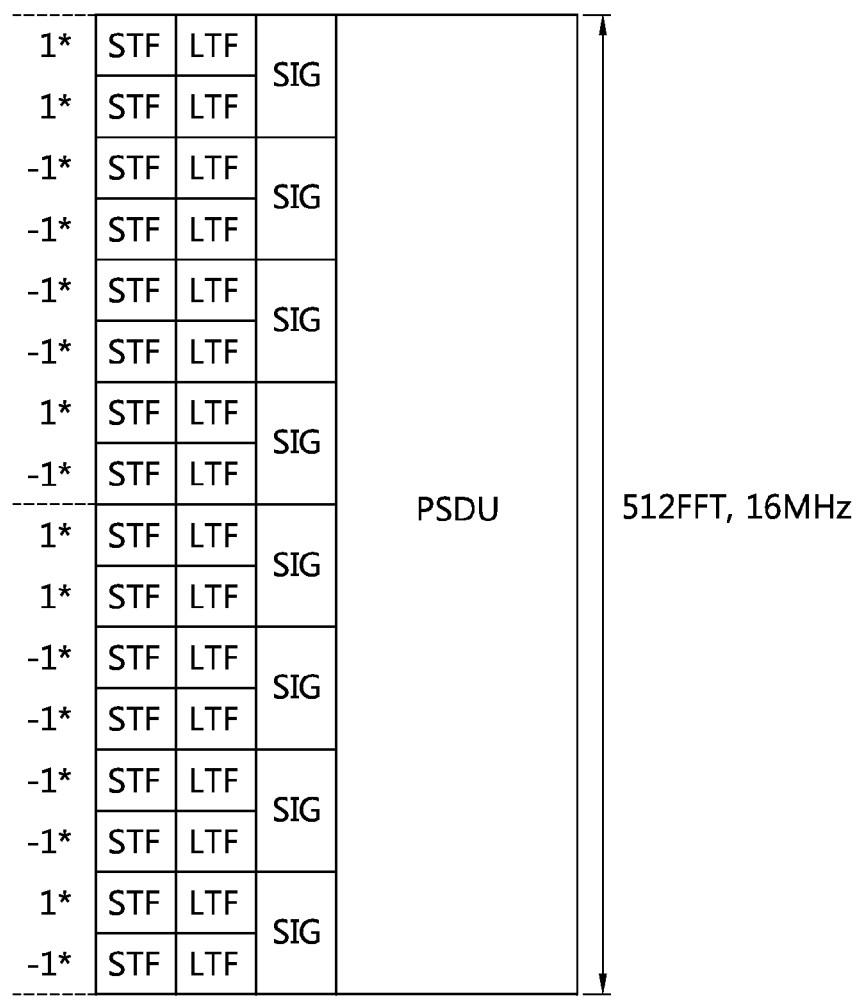
FIG. 18 is a diagram illustrating still another example of a PPDU transmission structure to which a modulation set is applied according to an embodiment of the present invention.

As described above, upon transmission of the 16 MHz PPDU, a modulation vector of length 16 is applicable. In addition, a modulation set applicable to 8 MHz PPDU is repeatedly applicable to a 16 MHz band. However, a modulation set vector of length 16 is applicable to transmission of the PPDU for a continuous 16 MHz bandwidth, but is not applicable to transmission of the PPDU for a discontinuous 16 MHz bandwidth. FIG. 18 illustrates an example of a PPDU transmission structure to which a modulation vector of length 8 is repeatedly applied for 16 MHz PPDU.

TABLE 5

| $a_0$ | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | PAPR[dB] |
|---|---|---|---|---|---|---|---|---|---|---|---|---|---|---|---|---|
| 1 | 1 | 1 | −1 | −1 | −1 | −1 | 1 | −1 | −1 | 1 | −1 | −1 | −1 | 1 | −1 | 2.77575903780133 |
| 1 | −1 | 1 | 1 | 1 | −1 | 1 | 1 | −1 | 1 | 1 | 1 | 1 | −1 | −1 | −1 | 2.77575903780133 |
| −1 | 1 | −1 | −1 | −1 | 1 | −1 | −1 | 1 | −1 | −1 | −1 | −1 | 1 | 1 | 1 | 2.77575903780133 |
| −1 | −1 | −1 | 1 | 1 | 1 | 1 | −1 | 1 | 1 | −1 | 1 | 1 | 1 | −1 | 1 | 2.77575903780133 |
| 1 | −1 | 1 | −1 | −1 | −1 | −1 | 1 | 1 | 1 | 1 | −1 | 1 | 1 | 1 | 1 | 2.77575903780133 |
| −1 | 1 | −1 | −1 | 1 | −1 | 1 | 1 | 1 | −1 | −1 | −1 | 1 | −1 | −1 | −1 | 2.77575903780133 |
| 1 | 1 | 1 | −1 | 1 | 1 | 1 | −1 | −1 | −1 | 1 | −1 | 1 | 1 | −1 | 1 | 2.77575903780133 |
| −1 | −1 | −1 | 1 | −1 | −1 | −1 | 1 | 1 | 1 | −1 | 1 | −1 | −1 | 1 | −1 | 2.77575903780133 |

In addition, a modulation set $[b_0\ b_1\ b_2\ \ldots\ b_{15}]$ applicable to the LTF may be expressed by a following table 6.

TABLE 6

| $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | PAPR[dB] |
|---|---|---|---|---|---|---|---|---|---|---|---|---|---|---|---|---|
| 1 | 1 | 1 | −1 | −1 | −1 | −1 | 1 | −1 | −1 | 1 | −1 | −1 | −1 | 1 | −1 | 5.93054872143713 |
| 1 | −1 | 1 | 1 | 1 | −1 | 1 | 1 | −1 | 1 | 1 | 1 | 1 | −1 | −1 | −1 | 5.93054872143713 |
| −1 | 1 | −1 | −1 | −1 | 1 | −1 | −1 | 1 | −1 | −1 | −1 | −1 | 1 | 1 | 1 | 5.93054872143713 |
| −1 | −1 | −1 | 1 | 1 | 1 | 1 | −1 | 1 | 1 | −1 | 1 | 1 | 1 | −1 | 1 | 5.93054872143713 |

A received signal ($r_{subfield}(t)$) of each field according to a PPDU transmission structure applying the above modulation set may be expressed by a IDFT (Inverse Discrete Fourier Transform) type of equation 2.

$$r_{Subfield}^{(i_{Seg}, i_{TX})}(t) = \frac{1}{\sqrt{N_{Field}^{Tone} N_{Norm}}} w_{T_{Subfield}}(t) \quad \text{[Equation 2]}$$

$$\sum_{k=-N_{SR}}^{N_{SR}} \sum_{u=0}^{N_u-1} \sum_{m=1}^{N_{STS,u}} [Q_k^{(iSeq)}]_{i_{TX},(M_u+m)} \gamma_{k,BW} X_{k,u}^{(i_{Seg},m)}$$

$$\exp(j2\pi k\Delta_F(t - T_{GI,Field} - T_{CS,VHT}(M_u + m)))$$

The $N_{Field}^{Tone}$ is a tone scaling factor with respect to a physical layer field, and may be implemented as function of a bandwidth per frequency segment.

In a case of a field before VHT-modulation, the $N_{Norm}$ has a value of $N_{TX}$. In a case of a VHT-modulated filed, the $N_{Norm}$ has a value of $N_{STS,total}$. The $N_{TX}$ represents the number of transmit chains, and the $N_{STS,total}$ represents the total number of space streams for PPDU transmission.

The $\omega_{T_{subfield}}(t)$ represents a specific windowing function.

The $N_{SR}$ represents a timing related constant.

In a case of a field before VHT-modulation, the $N_{user}$ is 1. In a case of a VHT-modulated filed, the $N_{user}$ is the number of users associated with the PPDU transmission.

In a case of a field before VHT-modulation, the $N_{STS,u}$ is 1. In a case of a VHT-modulated filed, the $N_{STS,u}$ is the number of space streams with respect to a specific user.

In a case of a field before VHT-modulation, the $M_u$ is 0. In a case of a VHT-modulated filed, if u=0, when u is in the range of 1 to $N_{user}-1$, the $M_u$ is a total number of space stream with respect to each user.

The $[X]_{a,b}$ indicates a row a and a column b of a matrix x.

The $Q_k^{(iseq)}$ represents a space mapping matrix with respect to a sub-carrier k in a frequency segment $i_{Seg}$.

The $\Delta_F$ represents subcarrier frequency spacing.

The $X_{k,u}^{(iseg,m)}$ represents a frequency domain symbol in a sub-carrier k of a user u with respect to a frequency segment $i_{Seg}$ of an m space stream.

The $T_{GI,Field}$ represents a guard interval duration used with respect to each OFDM symbol in a corresponding field.

In a case of a field before VHT-modulation, the $T_{CS,VHT}(1)$ is 0. In a case of a VHT-modulated filed, the $T_{CS}^{VHT}(1)$ represents a cyclic shift per space stream.

In the equation 2, $\gamma_{k,BW}$ can have different values according to a bandwidth of the PPDU. A following equation 3 represents a gamma parameter in a case of 8 MHz transmission.

$$\gamma_{k,8} = \begin{cases} a_0, k < -96 \\ a_1, -96 \leq k < -64 \\ a_2, -64 \leq k < -32 \\ a_3, -32 \leq k < 0 \\ a_4, 0 \leq k < 32 \\ a_5, 32 \leq k < 64 \\ a_6, 64 \leq k < 96 \\ a_7, 96 \leq k \end{cases} \quad \text{[Equation 3]}$$

In this case, when transmitting 8 MHz PPDU, [1 1 −1 −1 −1 −1 1 −1] is applied as a modulation set vector, and the gamma parameter may be expressed by a following equation 4.

$$\gamma_{k,8} = \begin{cases} 1, k < -64 \\ -1, -64 \leq k < 64 \\ 1, 64 \leq k < 96 \\ -1, 96 \leq k \end{cases} \quad \text{[Equation 4]}$$

A following equation 5 represents a gamma parameter in a case of 8 MHz transmission.

$$\gamma_{k,16} = \begin{cases} a_0, k < -224 \\ a_1, -224 \leq k < -192 \\ a_2, -192 \leq k < -160 \\ a_3, -160 \leq k < -128 \\ a_4, -128 \leq k < -96 \\ a_5, -96 \leq k < -64 \\ a_6, -64 \leq k < -32 \\ a_7, -32 \leq k < 0 \\ a_8, 0 \leq k < 32 \\ a_9, 32 \leq k < 64 \\ a_{10}, 64 \leq k < 96 \\ a_{11}, 96 \leq k < 128 \\ a_{12}, 128 \leq k < 160 \\ a_{13}, 160 \leq k < 192 \\ a_{14}, 192 \leq k < 224 \\ a_{15}, 224 \leq k \end{cases} \quad \text{[Equation 5]}$$

In this case, upon 16 MHz PPDU transmission, [1 1 1 −1 −1 −1 −1 1 −1 −1 1 −1 −1 −1 1 −1] is applied as a modulation set vector, the gamma parameter may be expressed by a following equation 6.

$$\gamma_{k,16} = \begin{cases} 1, k < -160 \\ -1, -160 \leq k < 32 \\ 1, -32 \leq k < 0 \\ -1, 0 \leq k < 64 \\ 1, 64 \leq k < 96 \\ -1, 96 \leq k < 192 \\ 1, 192 \leq k < 224 \\ -1, 224 \leq k \end{cases} \quad \text{[Equation 6]}$$

In a method for transmitting data units according to an embodiment of the present invention, an STF (Short Training Field) and an LTF (Long Training Field) included in data units are duplicated at least once by using a 1 MHz bandwidth as a unit band to be transmitted through a bandwidth of 1 MHz or greater. Accordingly, a station supporting 1 MHz transmission/reception may receive and interpret an STF and an LTF of a data unit transmitted by a station supporting transmission/reception of a bandwidth of 1 MHz or greater to recognize a channel use situation. In the method for transmitting data units according to an embodiment of the present invention, a specific modulation set vector is applied to the STF and the LTF duplicated and transmitted based on a unit bandwidth so that the STF and the LTF are transmitted. Accordingly, performance degradation of PAPR (Peak to Average Power Ratio) caused because the STF and the LTF are duplicated on at least one 1 MHz band so that the STF and the LTF and one or more duplicated STFs and LTFs are transmitted, may be reduced. A service quality of the wireless LAN system may be improved.

Figure 19:
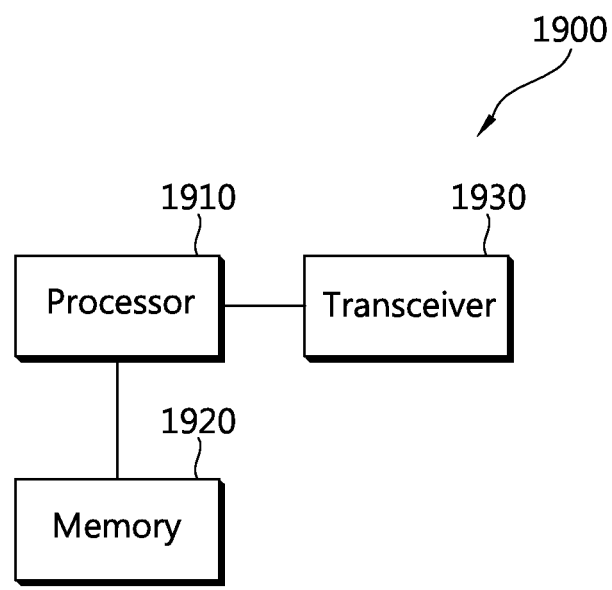
FIG. 19 is a block diagram illustrated a wireless device to implement embodiments of the present invention.

FIG. 19 is a block diagram illustrated a wireless device to implement embodiments of the present invention.

Referring to FIG. 19, a wireless device 1900 includes a processor 1910, a memory 1920, and a transceiver 1930. The transceiver 1930 transmits and/or receives a wireless signal, and implements a physical layer of IEEE 802.11. The processor 1910 is functionally connected to the transceiver 1930 to be operated. The processor 1910 may generate and transmit a data unit of a format according to an embodiment of the present invention.

The processor 1910 may transmit the data unit by duplicating the STF and the LTF on one or more channels. The processor 1910 may transmit the STF and the LTF by applying the modulation set vector. The processor 1910 may implement a method for transmitting data units according the embodiment of the present invention.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting data in a wireless local area network, the method comprising:
generating, by a wireless station, a first training field sequence for a 1 MHz bandwidth;
duplicating, by the wireless station, the first training field sequence over an 8 MHz bandwidth;
configuring a preamble of a physical layer protocol data unit (PPDU) to be used for the 8 MHz bandwidth by applying, by the wireless station, a phase modulation to the duplicated first training field sequence by applying {a0, a1, a2, a3, a4, a5, a6, a7}={1, −1, 1, 1, 1, 1, −1, −1} to the duplicated first training field sequence as shown:

$a0, k<-96$ $a1, -96 \leq k < -64$ $a2, -64 \leq k < -32$ $a3, -32 \leq k < 0$ $a4, 0 \leq k < 32$ $a5, 32 \leq k < 64$ $a6, 64 \leq k < 96$ $a7, 96 \leq k$ where k denotes a subcarrier index of a subcarrier on which the duplicated first training field sequence is to be transmitted, and
transmitting, by the wireless station, a frame including the preamble of the PPDU over the 8 MHz bandwidth to a receiver.

2. The method of claim 1, further comprising:
generating, by the wireless station, a second training field sequence for a 1 MHz bandwidth;
duplicating, by the wireless station, the second training field sequence over an 8 MHz bandwidth; and
applying a phase modulation to the duplicated second training field sequence by applying {a0, a1, a2, a3, a4, a5, a6, a7}={1, −1, 1, 1, 1, 1, −1, −1} to the duplicated second training field sequence as shown:

$a0, k<-96$ $a1, -96 \leq k < -64$ $a2, -64 \leq k < -32$ $a3, -32 \leq k < 0$ $a4, 0 \leq k < 32$ $a5, 32 \leq k < 64$ $a6, 64 \leq k < 96$ $a7, 96 \leq k$ wherein the preamble of the PPDU further includes the phase modulated second training field sequence.

3. The method of claim 2, wherein the phase modulated first training field sequence in the PPDU is transmitted in 4 orthogonal frequency division multiplexing (OFDM) symbols, and the phase modulated second training field sequence is transmitted in 4 OFDM symbols that is subsequent to the 4 OFDM symbols for the phase modulated first training field sequence.

4. The method of claim 2, wherein the first training field sequence includes a short training field sequence and the second training field sequence includes a long training field sequence.

5. The method of claim 1, wherein the PPDU further includes a signal field and a data field.

6. The method of claim 5, wherein the signal field is transmitted in 6 OFDM symbols.

7. A wireless device for operating in a wireless local area network, the wireless device comprising:
a transceiver that transmits and receives radio signals; and
a processor, operatively coupled with the transceiver that:
generates a first training field sequence over 8 for a 1 MHz bandwidth;
duplicates the first training field sequence over an 8 MHz bandwidth;
configures a preamble of a physical layer protocol data unit (PPDU) to be used for the 8 MHz bandwidth by applying a phase modulation to the duplicated first training field sequence by applying {a0, a1, a2, a3, a4, a5, a6, a7}={1, −1, 1, 1, 1, 1, −1, −1} to the duplicated first training field sequence as shown:

$a0, k<-96$ $a1, -96 \leq k < -64$ $a2, -64 \leq k < -32$ $a3, -32 \leq k < 0$ $a4, 0 \leq k < 32$ $a5, 32 \leq k < 64$ $a6, 64 \leq k < 96$ $a7, 96 \leq k$ where k denotes a subcarrier index of a subcarrier on which the duplicated first training field sequence is to be transmitted; and instructs the transceiver to transmit a frame including the preamble of the PPDU over the 8 MHz bandwidth to a receiver.

8. The wireless device of claim 7, wherein the processor further:
generates a second training field sequence over for 1 MHz bandwidth;
duplicates the second training field sequence over 8 MHz bandwidth; and
applies a phase modulation to the duplicated second training field sequence by applying {a0, a1, a2, a3, a4, a5, a6, a7}={1, −1, 1, 1, 1, 1, −1, −1} to the duplicated second training field sequence as shown:

$a0, k<-96$ $a1, -96 \leq k < -64$ $a2, -64 \leq k < -32$ $a3, -32 \leq k < 0$ $a4, 0 \leq k < 32$ $a5, 32 \leq k < 64$ $a6, 64 \leq k < 96$ $a7, 96 \leq k$ wherein the preamble of the PPDU further includes the phase modulated second training field sequence.

9. The wireless device of claim 8, wherein the phase modulated first training field sequence in the PPDU is transmitted in 4 orthogonal frequency division multiplexing (OFDM) symbols, and the phase modulated second training field sequence is transmitted in 4 OFDM symbols that is subsequent to the 4 OFDM symbols for the phase modulated first training field sequence.

10. The wireless device of claim 8, wherein the first training field sequence includes a short training field sequence and the second training field sequence includes a long training field sequence.

11. The wireless device of claim 7, wherein the PPDU further includes a signal field and a data field.

12. The wireless device of claim 11, wherein the signal field is transmitted in 6 OFDM symbols.

* * * * *